United States Patent
Kennedy et al.

(10) Patent No.: US 8,335,740 B2
(45) Date of Patent: Dec. 18, 2012

(54) METHOD, SYSTEM, AND COMPUTER-READABLE MEDIUM FOR MANAGING AND COLLECTING RECEIVABLES

(75) Inventors: Amy Kennedy, Richmond, VA (US); Julie Bell, Muncie, IN (US); Tyler Roark, Muncie, IN (US); Kenneth Couch, Muncie, IN (US); Brian Cutler, Long Grove, IL (US); Benjamin Kolb, Economy, IN (US)

(73) Assignee: Ontario Systems, LLC, Muncie, IN (US)

( * ) Notice: Subject to any disclaimer, the term of this patent is extended or adjusted under 35 U.S.C. 154(b) by 0 days.

(21) Appl. No.: 13/106,676

(22) Filed: May 12, 2011

(65) Prior Publication Data

US 2011/0295631 A1  Dec. 1, 2011

Related U.S. Application Data

(60) Provisional application No. 61/333,888, filed on May 12, 2010, provisional application No. 61/418,345, filed on Nov. 30, 2010, provisional application No. 61/444,567, filed on Feb. 18, 2011.

(51) Int. Cl.
*G06Q 40/00* (2012.01)
(52) U.S. Cl. .......................................... 705/38; 705/35
(58) Field of Classification Search ............... 705/35, 705/38
See application file for complete search history.

(56) References Cited

U.S. PATENT DOCUMENTS

| | | | | |
|---|---|---|---|---|
| 6,098,052 A * | 8/2000 | Kosiba et al. | ................... | 705/40 |
| 7,167,839 B1 * | 1/2007 | Layne | ............................ | 705/40 |
| 7,559,217 B2 * | 7/2009 | Bass | ................................ | 70/40 |
| 2002/0042773 A1 * | 4/2002 | Fugitte et al. | .................... | 705/39 |
| 2002/0116245 A1 * | 8/2002 | Hinkle et al. | ..................... | 705/8 |
| 2002/0138409 A1 * | 9/2002 | Bass | ................................ | 705/38 |
| 2003/0187826 A1 * | 10/2003 | Kennedy et al. | ................... | 707/1 |
| 2005/0080821 A1 * | 4/2005 | Breil et al. | ................. | 707/104.1 |
| 2007/0022118 A1 * | 1/2007 | Layne | ................................ | 707/9 |
| 2007/0043659 A1 * | 2/2007 | Kass et al. | ........................ | 705/38 |
| 2007/0043660 A1 * | 2/2007 | Kass et al. | ........................ | 705/38 |
| 2007/0043661 A1 * | 2/2007 | Kass et al. | ........................ | 705/38 |
| 2008/0077525 A1 * | 3/2008 | Willey et al. | ..................... | 705/40 |
| 2009/0089190 A1 * | 4/2009 | Girulat, Jr. | ........................ | 705/30 |
| 2009/0228386 A1 * | 9/2009 | Layne | ............................. | 705/35 |
| 2009/0319414 A1 * | 12/2009 | DeBie | ............................. | 705/35 |
| 2009/0327123 A1 * | 12/2009 | Wolfson | .......................... | 705/39 |
| 2010/0114744 A1 * | 5/2010 | Gonen | ............................ | 705/35 |
| 2010/0153305 A1 * | 6/2010 | Lindgren | .................... | 705/36 R |
| 2010/0161459 A1 * | 6/2010 | Kass et al. | ........................ | 705/30 |
| 2010/0205089 A1 * | 8/2010 | Srinivasan et al. | .............. | 705/38 |
| 2010/0268640 A1 * | 10/2010 | Kuyper et al. | ................... | 705/38 |
| 2011/0016042 A1 * | 1/2011 | Cho et al. | ......................... | 705/38 |
| 2011/0078073 A1 * | 3/2011 | Annappindi | .................... | 705/38 |

* cited by examiner

*Primary Examiner* — Jagdish Patel
*Assistant Examiner* — Sara C Hamilton
(74) *Attorney, Agent, or Firm* — Ice Miller LLP

(57) ABSTRACT

A method, system, and computer-readable medium for managing and collecting receivables are disclosed. Such a method includes providing at least one pre-existing account with first account information, the first account information having first account party data and providing at least one new account, each new account comprising new account information, the new account information having new account party data. The method also includes determining whether the first account party data of the pre-existing account matches the new account party data of the at least one new account and if so, tying the at least one new account with the matching pre-existing account to create a tied account. The method further includes calculating a score for any unmatched new account and any tied account based on at least one financial parameter and applying one or more collection strategies.

20 Claims, 30 Drawing Sheets

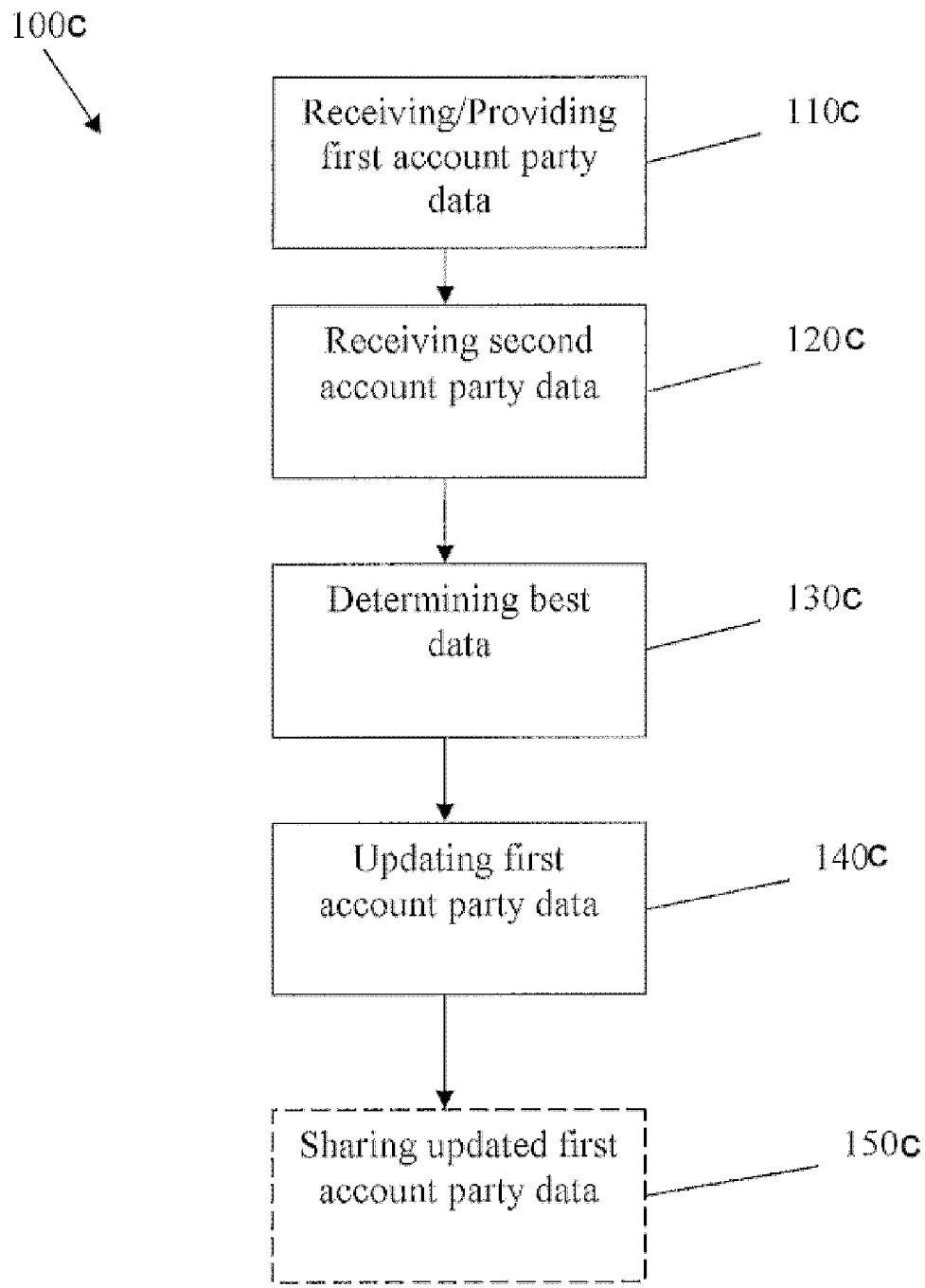

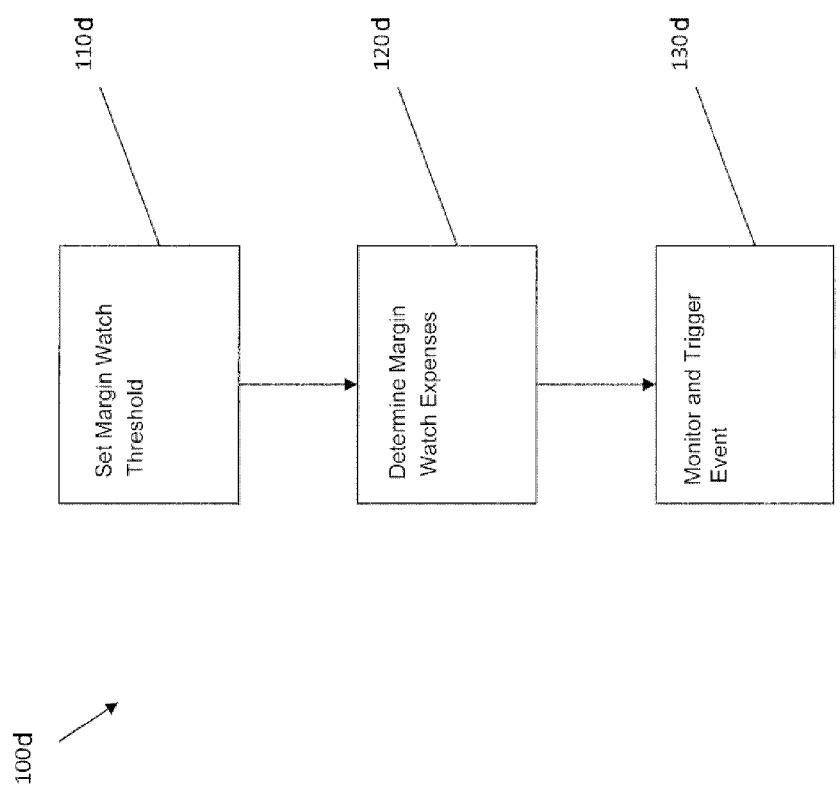

Main Explorer Screen

Scoring Model

Champion/Challenger

Cycle Dialog

Fig. 18

METHOD, SYSTEM, AND COMPUTER-READABLE MEDIUM FOR MANAGING AND COLLECTING RECEIVABLES

CROSS REFERENCE TO RELATED APPLICATIONS

This patent application claims the benefit of and incorporates by reference herein the disclosures of U.S. Ser. No. 61/333,888, filed May 12, 2010, U.S. Ser. No. 61/418,345, filed Nov. 30, 2010, and U.S. Ser. No. 61/444,567, filed Feb. 18, 2011.

BACKGROUND

The receivables management industry deals with the collection of unpaid debt in all sectors of the economy (e.g., health care, student loans, credit cards, and retail). While some entities may try to collect their own unpaid debts, typically the delinquent accounts are turned over to a third party debt collector to manage the process of collecting the unpaid amounts. Such debt collectors employ various strategies to collect on unpaid accounts, such as making multiple phone calls to the debtor and sending a series of letters to the debtor's house. While implementation of one strategy for all debtors may be simple, it has been found that different and more tailored strategies for different types of debts are more effective and maximize returns on collection efforts. Unfortunately, such tailored strategies are costly and difficult to implement and manage.

Moreover, due to the variety of different industries and debtors that a debt collector deals with, it is difficult to determine the effectiveness of different strategies and what changes should be made to such strategies on a timely basis. As a result, some accounts become inactive and the debt collection process fails. It is also not abnormal for a debt collector to be contractually obligated to only use certain debt collection strategies for a client's account. In implementing such strategies, it is often difficult for a debt collector to ensure such obligations are being met. Without the ability to properly monitor and manage the implemented strategies, it becomes extremely difficult to determine the effectiveness of the strategies, comply with client requirements, and make improvements to such strategies.

Debt collectors also understand that the effectiveness of each collection strategy depends upon the personal information of the debtors. The account data, which includes information about the debt, usually does not change after the debt collector receives it from the client, unless portions of the data were recorded in error. Therefore, the account data typically does not need to be updated after initial receipt. However, the account party data (e.g., address or place of employment of the debtor) can change during the life of the account. Without the ability to properly monitor, manage, and update the account party data of debtors, it is extremely difficult to be successful in collecting unpaid amounts.

Accordingly, there exists a need for a way to effectively implement, manage, monitor, and improve collection strategies.

SUMMARY

The present disclosure discloses a method, system, and computer-readable medium for managing and collecting receivables. Such a method for managing and collecting receivables includes providing at least one pre-existing account with first account information, the first account information having first account party data and providing at least one new account, each new account comprising new account information, the new account information having new account party data. The method also includes determining whether the first account party data of the pre-existing account matches the new account party data of the at least one new account and if so, tying the at least one new account with the matching pre-existing account to create a tied account. It should be noted that the tying of accounts is optional, even when a match has been made. The method further includes calculating a score for any unmatched new account and any tied account based on at least one financial parameter and determining one or more collection strategies for any unmatched new account and any tied account based on the calculated score. The method also includes applying one or more collection strategies to any unmatched new account and any tied account. The one or more strategies may then be adjusted based on comparing the cost of the strategy to potential fee income expected based on that strategy.

The computer-readable medium for managing and collecting receivables includes a computer program for managing and collecting receivables. The computer-readable medium includes code portions to perform the steps described above for the method that are stored therein.

A system for managing and collecting receivables includes a data storage unit that stores at least one pre-existing account with first account information, the first account information having first account party data and at least one new account, each new account comprising new account information, the new account information having new account party data. The system also includes a computer system that is configured to determine whether the first account party data of the pre-existing account matches the new account party data of the at least one new account and if so, the computer system may tie the at least one new account with the matching pre-existing account to create a tied account. It should be noted that the tying of accounts is optional, even when a match has been made. Typically, the tying of accounts is conditional upon the strategy applied and also upon restrictions inherent in client contractual obligations. The computer system is also configured to calculate a score for any unmatched new account and any tied account based on at least one financial parameter, determine one or more collection strategies for any unmatched new account and any tied account based on the calculated score and/or other parameters, and apply one or more collection strategies to any unmatched new account and any tied account.

BRIEF DESCRIPTION OF THE DRAWINGS

The features and advantages of this disclosure, and the manner of attaining them, will be more apparent and better understood by reference to the accompanying drawings, wherein:

FIG. 1c shows a flowchart of a method of optimizing data according to at least one embodiment of the present disclosure.

FIG. 1d shows a flowchart of a method of monitoring profit margins of accounts according to at least one embodiment of the present disclosure.

FIGS. 15-19 illustrate a graphic user interface of the Margin Watch tool according to at least one embodiment of the present disclosure.

DETAILED DESCRIPTION

Figure 1A:
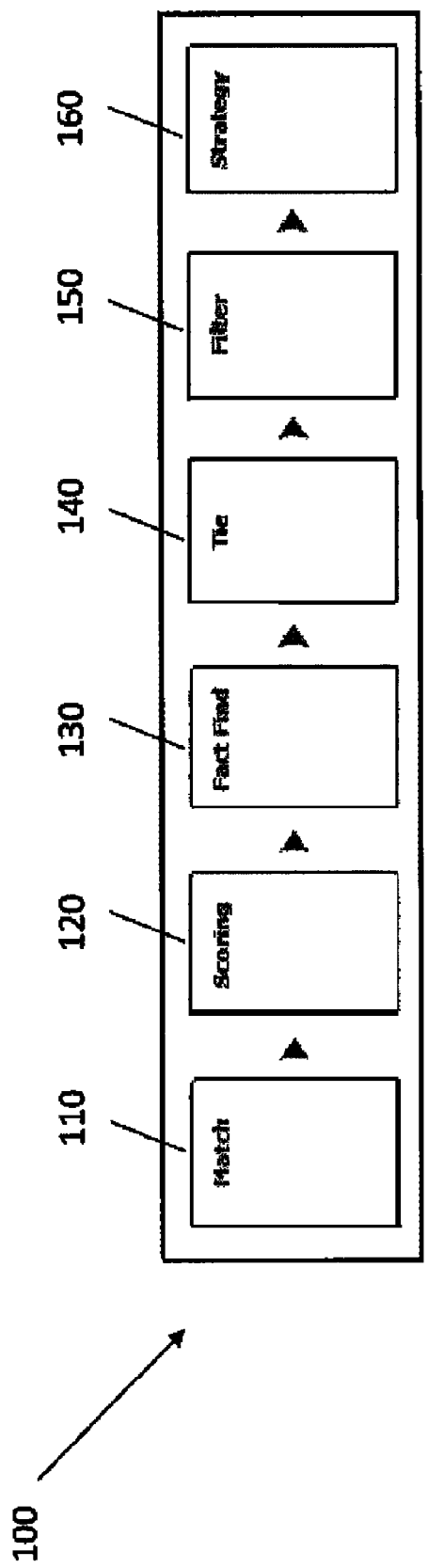
FIG. 1a shows a flowchart of a method of managing and collecting receivables according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present disclosure enables executives, business managers, and others that manage debt collection to successfully implement and improve their collection strategies. The present disclosure provides debt collectors with the needed flexibility in applying collection strategies, which may lead to increased effectiveness and the prevention of accounts from being left in a state of inactivity. The present disclosure includes a method, system, and computer-readable medium for managing and collecting receivables to effectively implement collection strategies, ensure conformance with each strategy, validate the effectiveness of each strategy, and continuously improve each strategy.

Figure 1B:
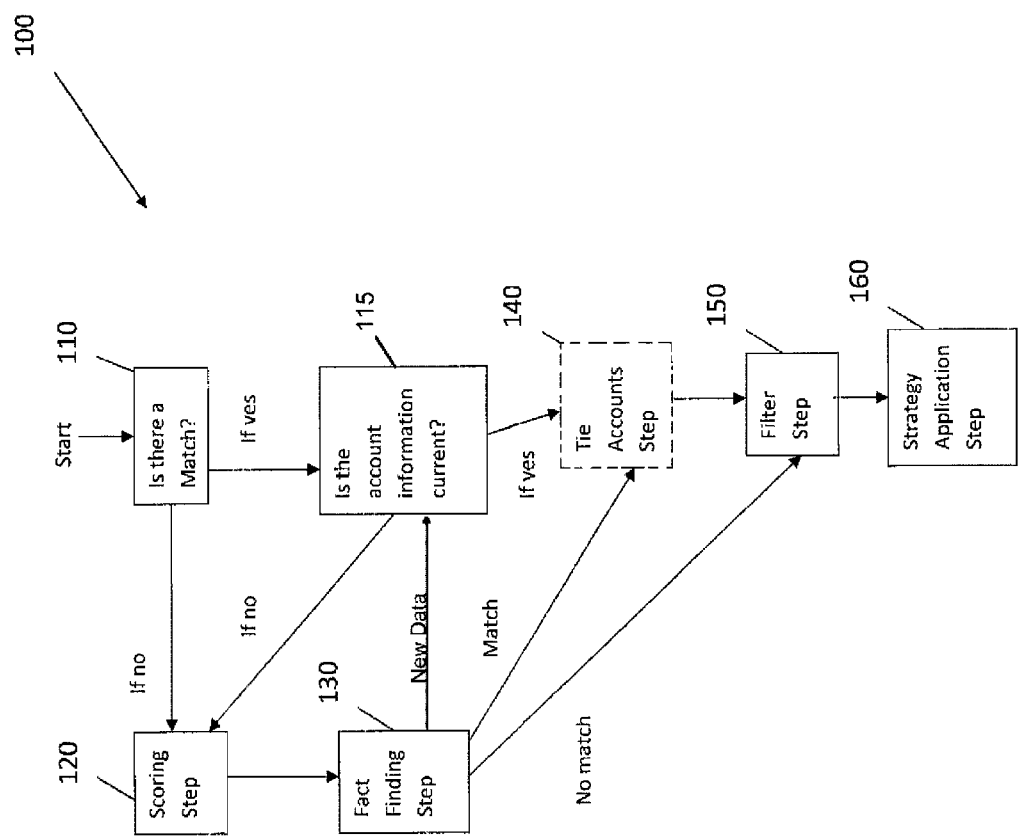
FIG. 1b shows a flowchart of a method of managing and collecting receivables according to at least one embodiment of the present disclosure.

Embodiments of a method for managing receivables are shown in FIGS. 1*a* and 1*b*. In FIGS. 1*a* and 1*b*, the method 100 begins with the Match step 110, which includes evaluating incoming accounts to determine whether or not the name on each new account ("account party") matches the name on a pre-existing account ("pre-existing account party"). Apart from the debtor's name on the accounts, the account information may include the debtor's employer's information, debtor's home address and telephone number, debtor's social security number, and the like. A match indicates that the new account party is, in fact, the same entity as the pre-existing account party. The account information may be provided to the Match step 110 in a variety of ways, such as, for example, imported from a computer network or manually entered by a user. As shown in FIG. 1*b*, if the account party is not identified by the Match step 110 (an unmatched account), then one or more of the subsequent steps in the method 100 may be omitted. In FIG. 1*b*, for example, the Tie Accounts step 140 (discussed below) may be optional if the account party is determined to not match with any pre-existing account parties.

Typically, debt collectors utilize one or more computer databases to store account information. For example, a computer database may contain, among other things, account information such as the balance on the account, the debtor's name and address, and the payment history of the debtor.

As shown in FIG. 1*b*, it should be noted that if a match is identified in the Match step 110 or if new data is identified in the Fact Finding step 130 (discussed below), the account information may be checked in the Optimization step 115. The Optimization step 115 may include the method of optimizing data 100*c* as described below or various other methods of determining how current the account information is at that time. If the account information is determined to be current in the Optimization step 115, then the next step after the Optimization step 115 may be the Tie Accounts step 140 or may be directly to the Filter step 150. As shown in FIG. 1*b*, if the account information is determined not to be current in the Optimization step 115, then the next step after the Optimization step 115 may be the Scoring step 120 (discussed below).

As shown in FIG. 1*a* and in FIG. 1*b* (assuming there is no match in Match step 110), the next step in this embodiment of method 100 may be the Scoring step 120. The Scoring step 120 includes a scoring model that is used to calculate a collectability score for each account party. For example, the scoring model may determine that an account party that has recently gone through bankruptcy has a low collectability score (e.g., two), while an account party that has only missed a few payments and never gone through bankruptcy may have a relatively high collectability score (e.g., seven). While any type of financial parameters can be used to determine a collectability score, some typical examples of parameters used in scoring models include, but are not limited to, delinquency history (number of times delinquent, maximum delinquency days, most recent delinquency date), total assets of the account party, bankruptcy, fraud, and employment information.

As shown in FIGS. 1*a* and 1*b*, the next step in this embodiment of method 100 may be the Fact Finding step 130. In general, the Fact Finding step 130 may involve purchasing data (e.g. credit reports or updated contact information) to assist in the collection effort. The Fact Finding step 130 may also include verifying the information provided by the account party (e.g., bankruptcy verification). The Fact Finding step 130 may allow for such verification and collection of data through the use of independent data vendors' services. In this embodiment, method 100 permits the debt collector to electronically access such services through the internet. As shown in FIG. 1*b*, the Fact Finding step 130 may be bypassed if the Match step 110 identifies the account party as a pre-existing account party because the pre-existing account may already have all the needed information. As shown in FIG. 1*b*, if the Fact Finding step 130 obtains new information, the new information may be checked to determine how current it is via the Optimization step 115.

The collectability score calculated in the Scoring Step 120 can be used to determine how much effort (and cost) is expended in the Fact Finding step 130 for a particular account. As would be expected, the Fact Finding step 130 may be more extensive (and generally more expensive) for accounts with higher outstanding balances. For example, when an account party has a high account balance and a high collectability score, the debt collector may set-up the Fact Finding step 130 to perform a rigorous (and more expensive) review of the account information and account party. On the other hand, the Fact Finding step 130 may be less extensive and rigorous if the account has a relatively low collectability score and/or lower outstanding account balance.

The Fact Finding step 130 may also provide debt collectors with the needed capability of efficiently managing and updating personal information of debtors so as to enhance their effectiveness in collection and the prevention of accounts from being left in a state of inactivity. For instance, the Fact Finding step 130 may include a method of optimizing data 100*c* as shown in FIG. 1*c*. In FIG. 1*c*, the method 100*c* begins with the step of receiving or providing first account party data 110*c*. It should be noted that the method 100*c* for optimizing data of the present disclosure may be used on its own or along with or to complement one or more programs. Of course, if the method 100c is part of method 100, then the step of receiving data 110c in method 100c may simply be or be part of the Match step 110. The account party data may include information about the debtor, including, but not limited to, demographics, place of employment, assets, and attorney.

The source of the first account party data in step 110c may typically be an original creditor, data services vendors, and collection and attorney firms to which a receivables management firm outsources work. In addition, the source of the first account party data may be another entity or may be inputted manually by the debt collector who may have the information from the debtor or another entity. It should be noted that, as described below, the first account party data may not necessarily be the original account party data from a creditor or the like. As will be understood from the discussion below, the first account party data may include the best data from a previous iteration of method 100c.

As shown in FIG. 1c, the next step in method 100c may be receiving second account party data 120c. The source of the second account party data in step 120c may be from one or more sources, including, but not limited to, a user with direct access to the account information (e.g., a user of Ontario Systems, LLC's Collect Savvy™ system), the source of the first account party data, a collection or attorney vendor, or a data services vendor (e.g., a vendor of Ontario Systems, LLC's Connect Savvy™ network).

As shown in FIG. 1c, the next step in method 100c may be determining the best data from the first and second account party data 130c. Best data refers to account party data that is determined to be the most current relative to the other account party information being considered for collection purposes. The best data from the first and second account party data may be determined by comparing the source of each of the first and second account party data and the age of the first and second data. For instance, best data may be based on whichever data is newer, the ranking of sources (e.g., source A is considered to have more trustworthy data over source B), the completeness of the data received, or a combination of such rules. For example, step 130c may include comparing the age of the place of employment information for the first account party data against the age of the place of employment information for the second account party data. The rules determining the best data may be created manually, imported from another entity, codified within the system, or the like.

The ranking of sources for best data purposes may typically be based on the quality of the sources. As an example, the ranking of the sources from best to worst quality may be a user of Ontario Systems, LLC's Collect Savvy™ system, a vendor of Ontario Systems, LLC's Connect Savvy™ network, a vendor (e.g., attorney or agency) to whom the account was forwarded, migrated data, and an update from the original source. In one example, if the first account party data has existed more than a predetermined amount of time (e.g., 180 days), step 130c may bypass any consideration of the quality of the sources and determine that the second account party data is the best data. It should be noted that if the first and second account party data are the same, the best data will simply be the first account party data.

As shown in FIG. 1c, the next step in method 100c may be applying the determined best data to the current account party data 140c, which may include updating the current account party data with the determined best data. For example, the residential address for an account party (John Smith) may be currently saved in a computer database as Address A. As account party data for John Smith is received from various sources in step 120c, the best data out of the account party data from the various sources is determined in step 130c. If the best data includes a residential address of Address B, then the computer database may be updated in step 140c by replacing Address A with Address B in the current account party data. Of course, if the incoming best data already exists in the computer database as the current account party data, then the account party data may not be updated.

As shown in FIG. 1c, the next step in method 100c may optionally be sharing the current account party data 150c, which may include sending current account party data to various clients. For example, once a month, every day, or upon the occurrence of every update, the account party data for one or more clients may be updated from the entity that determines best data. The various clients that receive updates to account party data may sign up via contracts, opt-in provisions, or other mechanisms. In some cases, the step of sharing the account party data 150c will be excluded from the system because an agreement between two parties (e.g., contractual restrictions), a law governing the relationship between two entities (e.g., privacy regulations), and the like may limit the use and sharing of personal and identifying information. For instance, privacy laws (e.g., Health Insurance Portability and Accountability Act) may limit the updated information that can be shared with others. The result is that some parties or entities may not be able to receive the best data for a given account party.

It should be noted that the method 100c described above may be used for a single account or across several accounts for the same account party. For instance, the method 100c may consider the account party data for several accounts relating to the same party and provide each of the accounts with the best data for the account party from the analysis of all accounts.

Typically, each of the steps described above for method 100c automatically processes incoming account information, although one or more of the steps may not be automatic or automated. This automation eliminates the human error of accidentally disregarding incoming account information, failing to properly select the best data, or following inefficient methods of determining the best data. As described below, the method 100c may be implemented into a computer-readable medium and be carried out with the aid of a computer.

As shown in FIGS. 1a and 1b, the next step in this embodiment of method 100 may optionally be the Tie Accounts step 140. The Tie Accounts step 140 includes grouping accounts together (such that they are "tied" together) by using the information obtained in the Match step 110, Scoring step 120, and/or Fact Finding step 130. The Tie Accounts step 140 utilizes tie options (or rules) to determine how and when accounts are tied together. For example, if the debt collector chooses, the accounts could be tied together only when all the responsible parties on the accounts are the same (e.g., the debtors are all the same on each account) or when any one responsible party is common throughout all of an account group (e.g., the debtor is the same but a different co-signor is listed on different accounts). Tied accounts generally have a better chance of being collected on because the debt collector can tailor the strategy (or combine multiple strategies into one strategy) for collection in view of the other accounts. Tied accounts also provide a greater return on investment for the debt collector because the debt collector is able to use a single action (e.g. one phone call) to collect on multiple accounts. The Tie Accounts step 140 may be bypassed if the Match step 110 is unable to find a matching account party. It should be noted that the tying of accounts is optional, even when a match has been made. Typically, the tying of accounts is conditional upon the strategy applied and also upon restrictions inherent in client contractual obligations.

As shown in FIGS. 1a and 1b, the next step in this embodiment of method 100 may be the Filter Accounts step 150. The Filter Accounts step 150 includes grouping/segmenting accounts and assigning collection strategies to such grouped/segmented accounts. The Filter Accounts step 150 may use the information obtained from one or more of the Match step 110, Scoring step 120, and/or Fact Finding step 130 to determine the most appropriate collection strategy for the grouped accounts. For example, grouped accounts with a high collectability score and a high balance may have a more aggressive collection strategy than grouped accounts with a low balance and low score. Each grouped account gets assigned a strategy which defines the collection approach to be taken on that account from inception to inactivation. In another example, the new data determined by the Fact Finding step 130 may cause a particular collection strategy based on, for example, demographics such as the city or state or the presence of bankruptcy information or assets or attorney.

In both scoring and grouping the accounts, the method 100 may rely on pre-defined standardized parameters provided by a vendor, such as Ontario Systems, LLC or on customized parameters set by the user of the method. For example, a debt collector may contractually agree that the accounts of one of its large clients may only be subject to particular collection strategies. As such, the Filter Accounts step 150 can be set by the debt collector only to select those permitted strategies for delinquent accounts provided by that client. After assigning such specialized accounts controlled by contract or the like to their strategies, the Filter Accounts step 150 may then segment the remaining accounts into the strategies it determines will provide the best return on investment.

The Filter Accounts step 150 may also include defining multiple competing collection strategies and diverting accounts by, for example, number of accounts or account balance from a champion strategy (which may be described as a strategy that is typically or has been recently employed for such accounts) to a challenger strategy (which may be described as a strategy different from what is typically or recently employed for such accounts). The Filter Accounts step 150 may use the account data obtained from the Match step 110, Scoring step 120, and/or Fact Finding step 130 to determine how to segment such accounts. Once the accounts have been segmented, a percentage of the segmented accounts may be assigned to the challenger strategy while the remainder of the accounts are provided to the champion strategy. The accounts are chosen at random from the segment to preserve the integrity of the challenger strategy experiment.

As shown in FIG. 1, the next step in this embodiment of method 100 may be the Strategy Application step 160. Generally, the Strategy Application step 160 includes implementing the strategies selected for the accounts in the Filter Accounts step 150. The Strategy Application step 160 may also include tracking settings, configurations, and other data regarding accounts and collection strategies. In this regard, the Strategy Application step 160 may include recording the cost of work activity on a per account basis and reacting once that cost approaches, meets, or exceeds a predetermined percentage of the desired potential fees to be earned on that account. Through such activity, the Strategy Application step 160 may provide a way to effectively lower the cost of recovery while ensuring that a debt collector's resources are applied to accounts that present the highest potential margin of recovery.

One embodiment of such a method for monitoring profit margins of accounts is shown in FIG. 1d. In FIG. 1d, the method 100d begins with the Margin Watch Threshold step 110d, which includes selecting a desired percentage of the potential fee for recovery of one or more accounts. The resultant fee amount (i.e., the desired percentage multiplied by the potential fee) is hereinafter called the Margin Watch Threshold. The Margin Watch Threshold step 110d may additionally include configuring various others collection features. For example, the debt collector may choose acceptable strategies for collection on certain accounts. It should also be noted that pre-defined standardized parameters provided by a vendor, such as Ontario Systems, LLC, may be implemented such that a debt collector would not be required to choose such features. It should be noted that the method for monitoring profit margins of accounts may not be invoked until or unless expenses are accumulated.

As shown in FIG. 1d, the next step in method 100d is the Margin Watch Expenses step 120d, which includes tracking the cost of recovery efforts ("Margin Watch Expenses") on each account. The Margin Watch Expenses step 120d includes collecting the costs of labor (e.g., the salary paid to an account representative working an account), making telephone calls, letters (e.g., the cost of an in-house letter that includes postage and printing costs), commission, and various other costs of recovery, such as costs associated with data products and services from vendors (e.g., Connect Savvy services).

The Margin Watch Expenses step 120d may calculate Margin Watch Expenses based on when and the amount of time that an account representative (or other user) works an account, the hourly rate or salary of the representative (or other user), data service that a user requests on an account (e.g., a type of Collect Savvy service), as well as various other cost factors encountered in collection activity.

Figure 1E:
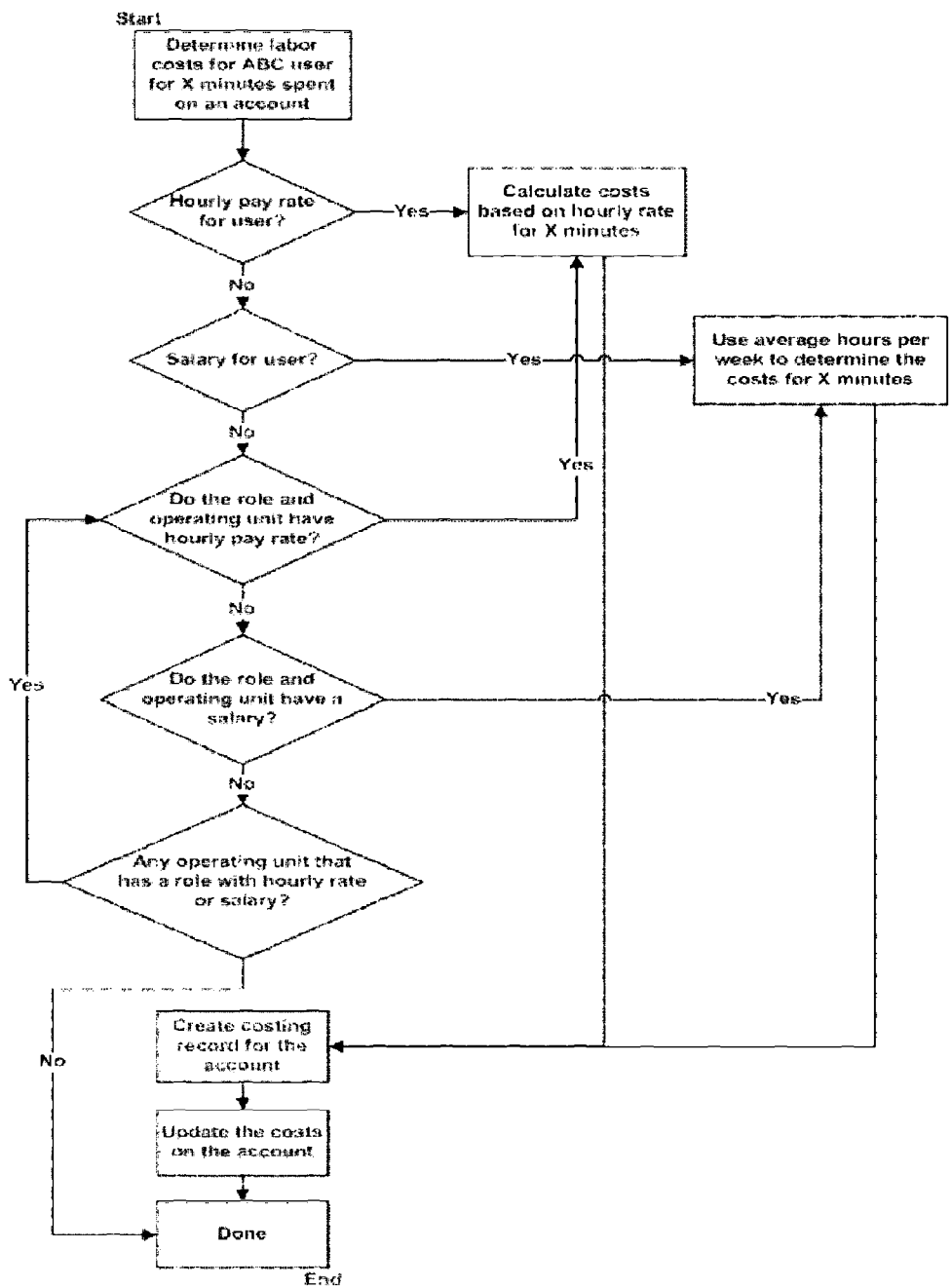
FIG. 1*e* shows a flowchart of a method of monitoring profit margins of accounts according to at least one embodiment of the present disclosure.
Figure 1F:
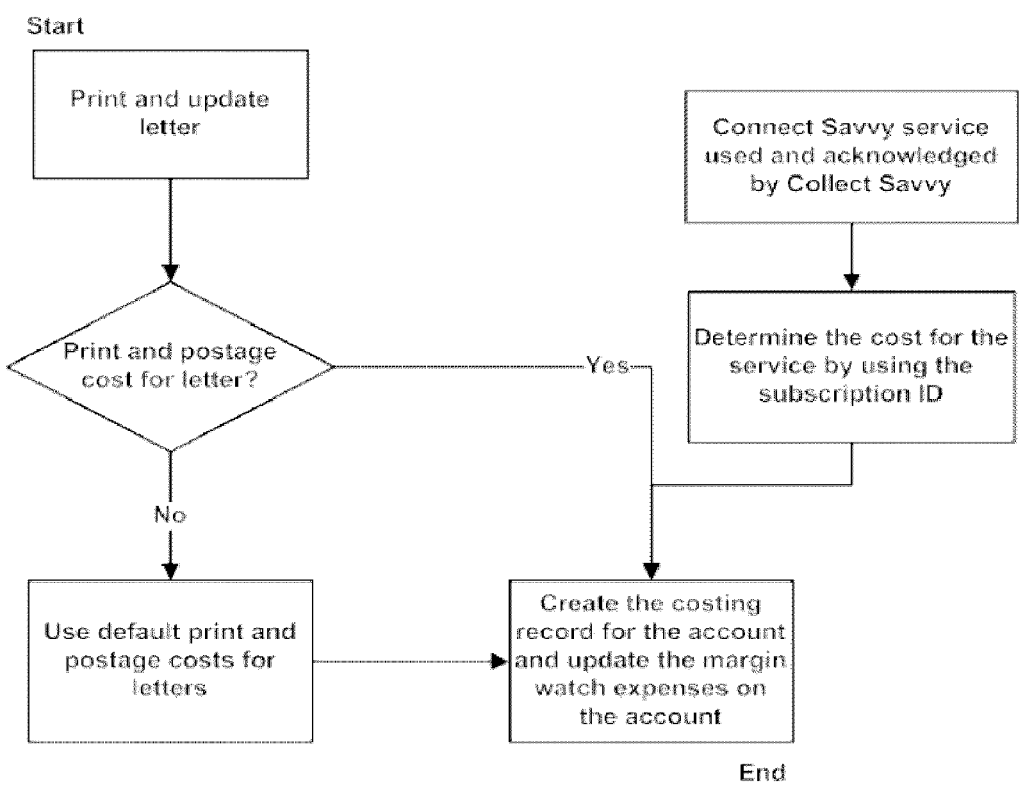
FIG. 1*f* shows a flowchart of a method of monitoring profit margins of accounts according to at least one embodiment of the present disclosure.

Of course, in order to calculate Margin Watch Expenses, a cost must be attributed to various activities. In some cases, the costs are readily available, such as, for example, the cost of a stamp. The cost of other activities may need to be approximated by the debt collector. For instance, the debt collector may need to set system-wide costs on an internal business unit, costs for printing and mailing a letter, costs for telephone calls, and costs for other activities relating to a collection strategy. It should be noted that the costs of various services (e.g., Connect Savvy) may be determined from subscription tables. FIG. 1e illustrates how expenses for labor may be calculated for the Margin Watch Expenses step 120d. FIG. 1f illustrates how expenses for letters and services may be calculated for the Margin Watch Expenses step 120d. In FIG. 1f, the services are for Connect Savvy.

When an account in a tied account group incurs Margin Watch Expenses, the costs are typically dispersed evenly across all accounts in the tied account group. For example, suppose a tied account group contains account 1, account 2, and account 3. If account 1 incurs an expense of $30, $10 is added to the balance of the costs for each account. Alternatively, the costs may be dispersed according to a predetermined set of rules.

The Margin Watch Expenses step 120d may also include creating a record of costs, such as labor costs, at various times and recording total Margin Watch Expenses for particular accounts at various times.

As shown in FIG. 1d, the next step in method 100d is the Monitoring and Triggering Event step 130d, which includes monitoring the Margin Watch Expenses and comparing the Margin Watch Expenses with the Margin Watch Threshold for one or more accounts. When Margin Watch Expenses approach, meet, or exceed the Margin Watch Threshold on an account (an "Event"), the Monitoring and Triggering Event step 130*d* may perform predetermined actions. Typically, the actions performed at the occurrence of an Event are directed to mitigating additional Margin Watch Expenses, such as by limiting or adjusting collection activities or stopping work on the account altogether. Instead of following predetermined actions at the occurrence of an Event, it should be noted that the Monitoring and Event step 130*d* may prompt users to reconfigure collection strategies to maximize return on collection activities. The Monitoring and Event step 130*d* may also include producing a report at specified times or intervals or at the direction of a user to identify accounts that have exceeded their particular Margin Watch Threshold.

Each of the steps described above for method 100*d* may be automated, although one or more of the steps may not be automatic or automated, such as, for example, the Margin Watch Threshold step 110*d*. The automation of the steps eliminates the human error of accidentally failing to monitor the expenses incurred on an account and/or following an inefficient or wasteful collection strategy. As described below, the method 100*d* may be implemented into a computer-readable storage medium and be carried out with the aid of a computer.

The Strategy Application step 160 may include analyzing the history and effectiveness of collection strategies. Such analysis can include allowing the debt collector to run reports on a near-real time basis to demonstrate the effectiveness of the strategies being employed for a group of accounts. For example, the champion and challenger strategies may be compared to determine which is most efficient and profitable. Based upon this comparison of such champion and challenger strategies, collection strategies themselves may be improved and collection efforts of collection managers may benefit by knowing which strategies are effective for particular accounts. By knowing which of (or what aspects of) the champion or challenger strategies are successful (such as by analyzing various phases and cycles, discussed below), a hybrid strategy may be created by adopting the best aspects of each of the collection strategies.

The Strategy Application step 160 may also break-up the processing of an account into phases. For example, a first phase may be a Pre Collect phase which may be followed by a Collections phase. Each phase may be further divided into cycles. Each cycle comprises the actions and order of actions that are taken for accounts. Cycles may be activity or time-based. For example, an activity-based cycle may involve a one-time personal visit to the debtor's home. Another example might be a review of a debtor's employment situation to prepare a request for wage garnishment.

A time-based cycle may be, for example, sending letters to the debtor's home twice a month for six months. Each action may be executed conditionally. For example, an action may be repeated because a precondition has not been satisfied, such as there being no response from the debtor in view of phone calls to debtor's phone. The actions may also be grouped together into programs to effortlessly utilize the same pattern of actions in multiple phases in the strategy. For example, the programs may include repeated calling or multiple letters or emails.

The Strategy Application step 160 also includes the ability to react to special circumstances by taking additional and/or alternate paths. Alternate paths to the collection workflow are described as stages. Accounts are typically moved into stages as a response to an event. For example, the debt collector may have obtained a payment arrangement for an account. The account would then be moved into a stage which would monitor the progress of the payment arrangement rather than continuing with the normal collection activity as specified by the phase cycle. When an account is moved into a stage, the activity specified by the phase cycle is paused. Once the stage has completed, the cycle is resumed unless the exit criteria for the cycle has already been met (e.g., payment has been received). Therefore, the Strategy Application step 160 monitors phases and cycles to track an account's progress in the collection process and further maximizes collection recovery.

It should be noted that a method comprising each of the Matching step 110, Filter step 150, and Strategy Application step 160 may comprise one embodiment of the present disclosure. That is, the Scoring step 120, Fact Finding step 130, and Tie Accounts step 140 may be optional in view of the outcome of the Matching step 110.

Typically, each of the steps described above for method 100 automatically advance accounts through the collection process, although one or more of the steps may not be automatic or automated. This automation eliminates the human error of accidentally omitting accounts from being worked, failing to comply with client requirement, and/or following an inefficient collection strategy. In particular, the Filter step 150 and Strategy Application step 160 may be automatically executed such that strategies are implemented and improved efficiently and quickly. As described below, the method 100 may be implemented into a computer-readable medium and be carried out with the aid of a computer.

A computer-readable medium, such as a non-volatile storage medium, may comprise the steps of the method for managing receivables described above. For instance, the method may be incorporated into a computer program to automatically monitor the accounts of debtors, automatically determine what collection strategy should be applied to a particular account, and automatically apply the selected strategy to the particular account. The computer program may be generated in any software language or framework such as C#, COBOL, C++, Microsoft® .NET Framework or the like.

The computer-readable medium for performing the embodiments of the present disclosure may include computer-readable program code portions, such as a series of computer instructions, embodied in the computer-readable medium. It should be understood that the computer-readable program code portions may include separate executable portions for performing distinct functions to accomplish embodiments of the present disclosure. Additionally, or alternatively, one or more of the computer-readable program portions may include one or more executable portions for performing more than one function to thereby accomplish embodiments of the process of the present disclosure.

In conjunction with the computer-readable medium, a computer that includes a processor, such as a programmable-variety processor responsive to software instructions, a hard-wired state machine, or a combination of these may be used to carryout the method disclosed above. Such computers may also include memory, which in conjunction with the processor is used to process data and store information. Such memory can include one or more types of solid state memory, magnetic memory, or optical memory, just to name a few. By way of non-limiting example, the memory can include solid state electronic random access memory (RAM); sequential access memory (SAM), such as first-in, first-out (FIFO) variety or last-in, first-out (LIFO) variety; programmable read only memory (PROM); electronically programmable read only memory (EPROM); or electronically erasable programmable read only memory (EEPROM); an optical disc memory (such as a DVD or CD-ROM); a magnetically encoded hard disc, floppy disc, tape, or cartridge media; or a combination of these memory types. In addition, the memory may be volatile, non-volatile, or a hybrid combination of volatile and non-volatile varieties. The memory may include removable memory, such as, for example, memory in the form of a non-volatile electronic memory unit; an optical memory disk (such as a DVD or CD ROM); a magnetically encoded hard disk, floppy disk, tape, or cartridge media; or a combination of these or other removable memory types.

The computers described above may also include a display upon which information may be displayed in a manner perceptible to the user, such as, for example, a computer monitor, cathode ray tube, liquid crystal display, light emitting diode display, touchpad or touchscreen display, and/or other means known in the art for emitting a visually perceptible output. Such computers may also include one or more data entry, such as, for example, a keyboard, keypad, pointing device, mouse, touchpad, touchscreen, microphone, and/or other data entry means known in the art. Each computer also may comprise an audio display means such as one or more loudspeakers and/or other means known in the art for emitting an audibly perceptible output.

The following discussion relating to FIGS. 2-10 describes an example of a computer-readable medium that comprises the steps of the method 100 described above. The computer program described in FIGS. 2-10 is referred to herein as the Strategy Commander tool. FIGS. 2-10 show graphical user interfaces of the Strategy Commander tool for various steps of the method 100 described above. The Strategy Commander tool provides a centralized configuration and visualization area for receivables management processes. It includes a completely automated and controlled execution of the collection strategy with both proactive and reactive processing. The Strategy Commander tool automates collection processes, configuration, and visualization in order to incorporate business or collection intelligence to prove or determine the most successful business strategies.

The Strategy Commander tool may be based on any development platform, such as Microsoft® Silverlight® application. While the Microsoft® Silverlight® application is used, any other number of development platforms may be used. As noted above, the Strategy Commander tool incorporates business or collection intelligence to provide a user with a rich, context-aware interface for defining, maintaining, and evaluating the collection strategies and all collection configurations. It uses visualization techniques to make strategy process flow simple to understand. As described below, the Strategy Commander tool may include the ability to drag and drop phases and the like, allowing easy alteration of the collection process flow. It also may offer option-based detail definition to both provide overall clarity and full transparency to the details. For example, in the definition of a phase cycle, the user can optionally specify exit criteria such as number of days in the phase which allow further control over the process flow.

The Strategy Commander tool generally allows business executives and others that manage receivables to define their desired collection processes without the need for an IT administrator by providing a user-friendly application and automating many of the steps of operation. It maximizes efficiency of operations through a proactive approach to collection process automation, a seamless transition between automated and manual processes, and reaction to outside influences. This combination of approaches allows overall collection strategy definition while providing the necessary flexibility for individual account circumstances. It also incorporates visualization of the collection processes and centralizes configuration in a single area to improve comprehension of the complex collection processes. As noted herein, the Strategy Commander tool includes the ability to define multiple competing debt collection strategies and use business or collection intelligence obtained by monitoring such processes to compare them and definitively prove one (or aspects of one or each) to be superior in profit maximization.

Figure 2:
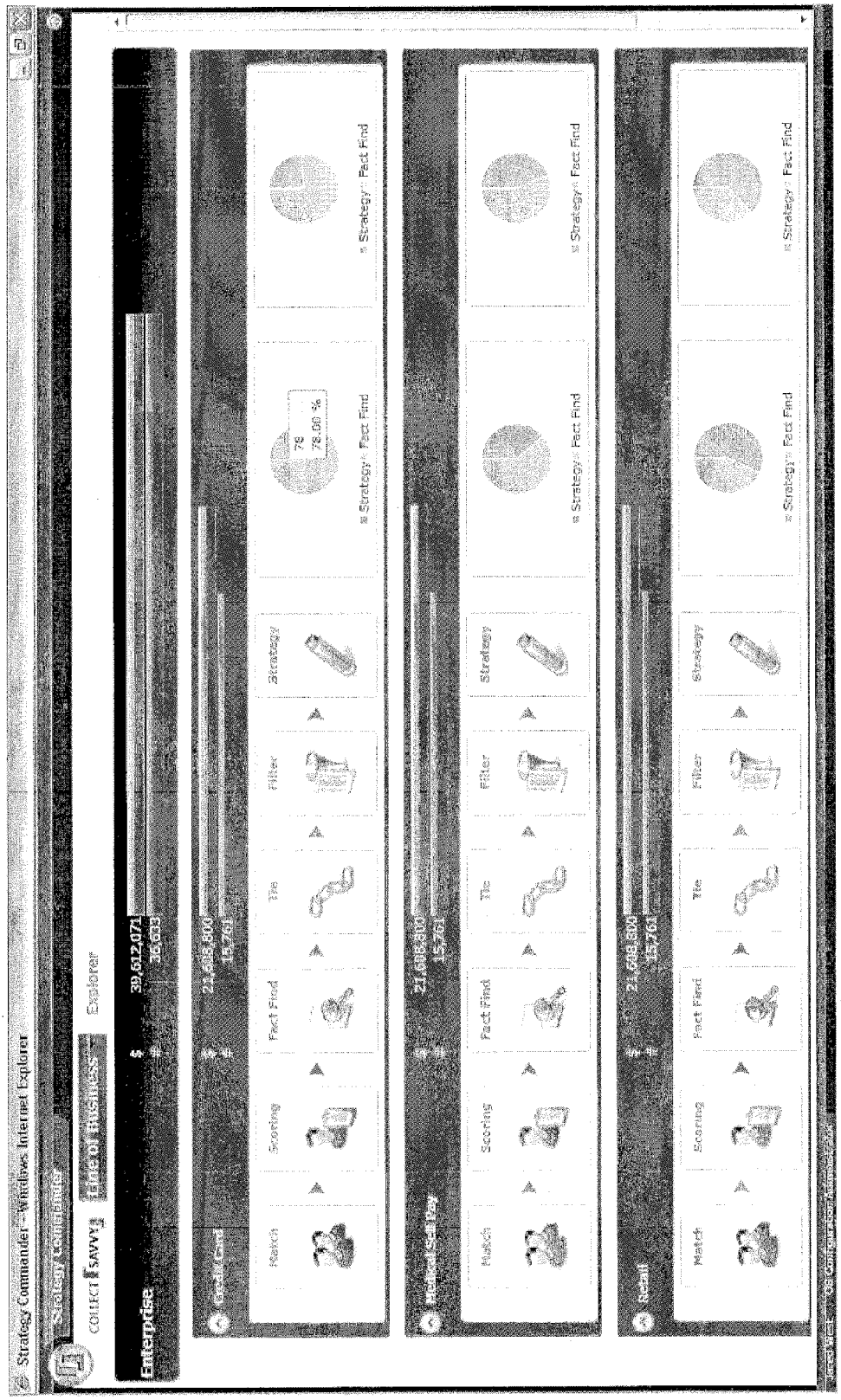
FIGS. 2-10 illustrate a graphic user interface of the Strategy Commander tool according to at least one embodiment of the present disclosure.

As shown in FIG. 2, the Strategy Commander tool may keep track of a variety of lines of business. For example, the screen shot in FIG. 2 displays 3 separate lines of business—credit card, medical self pay, and retail. The lines of business may include multiple accounts and are each part of the inventory for the Enterprise portion of the debt collector that is utilizing the Strategy Commander tool. For each line of business, inventory statistics for that particular line of business may be displayed. For example, in FIG. 2, for the Credit Card line of business, the inventory statistics include pie charts showing what percentage of accounts are in the Strategy Application step 160 and what accounts are in the Fact Finding step 130. Among other information, the inventory statistics may also include data about how much is being managed for that line of business.

Figure 3:
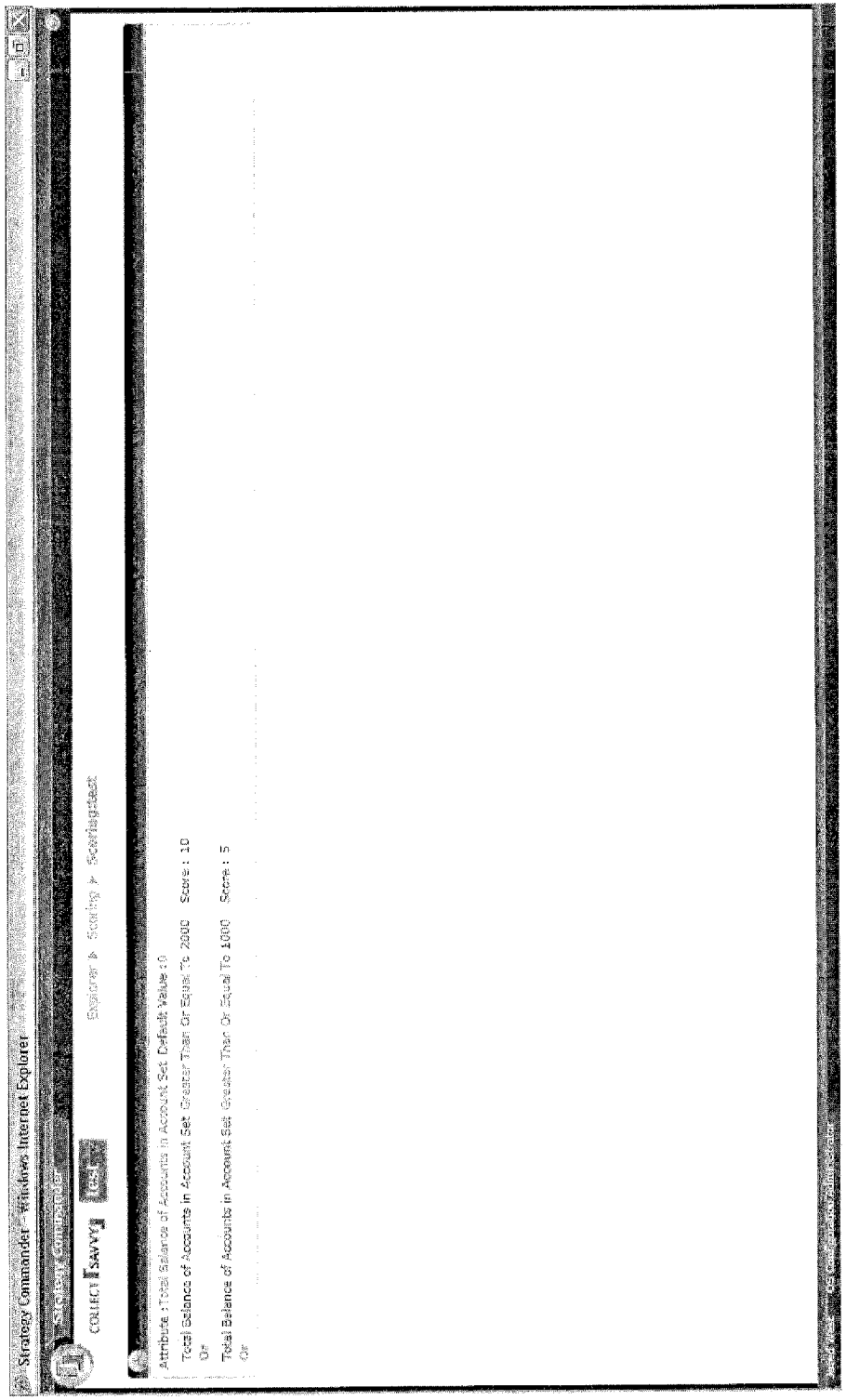

FIG. 3 shows a graphical user interface displaying results of the Scoring step 120, which was described above. As shown in FIG. 3, the account balance in this embodiment is used to determine the score for each account. As shown in FIG. 3, if the total balance of accounts is greater than or equal to two thousand dollars, then the score is ten. As described above, other account information may determine or contribute to the score for each account.

Figure 4:
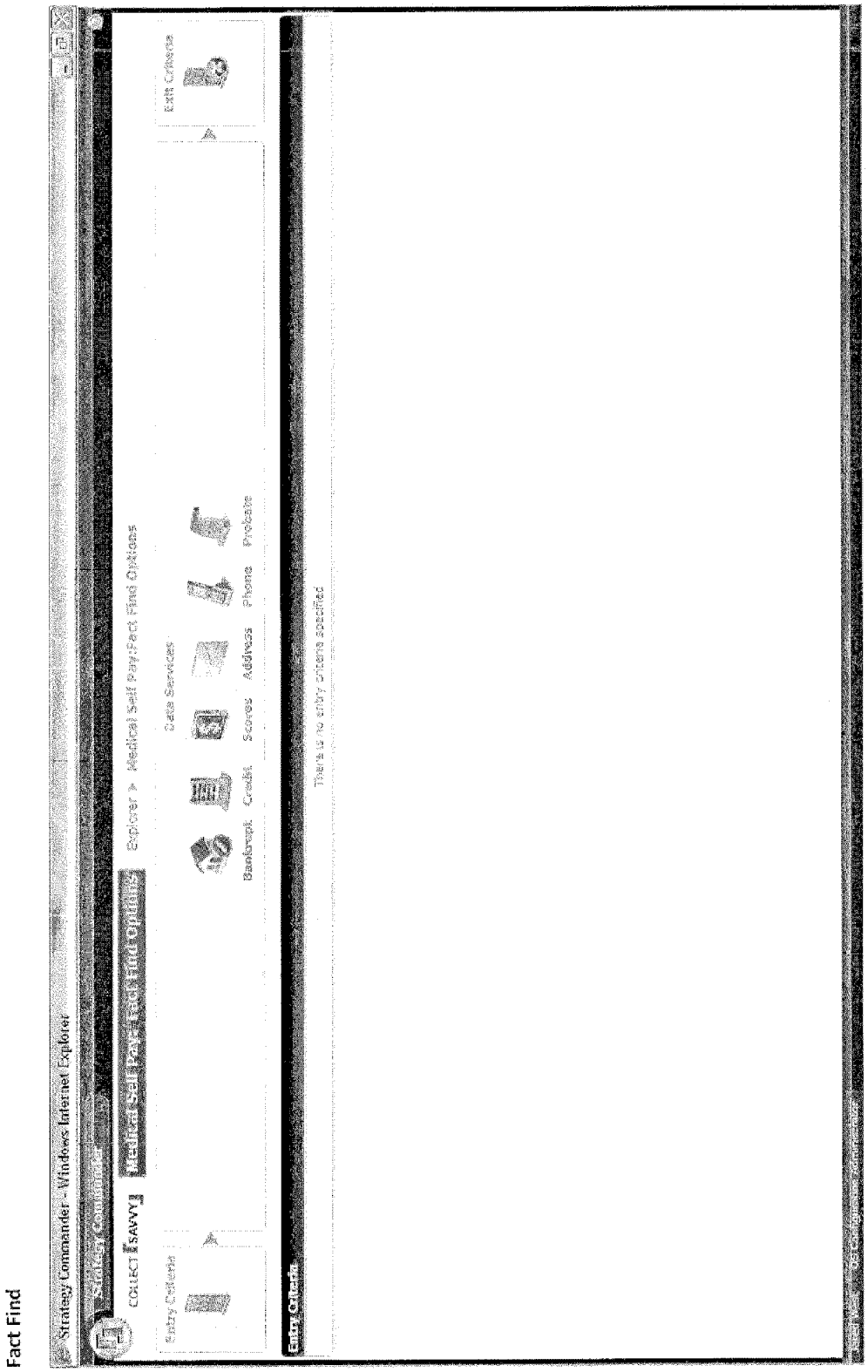

FIG. 4 shows a graphical user interface displaying the options available for the Fact Finding step 130. In this example, the options include services to check for bankruptcy, debtor's credit including the score, debtor's address and telephone numbers, and probate issues. As noted above, these services are typically provided by third parties or automatically accessed by the tool. However, in other embodiments, this information or service may be obtained or performed manually by a user of the Strategy Commander tool.

Figure 5A:
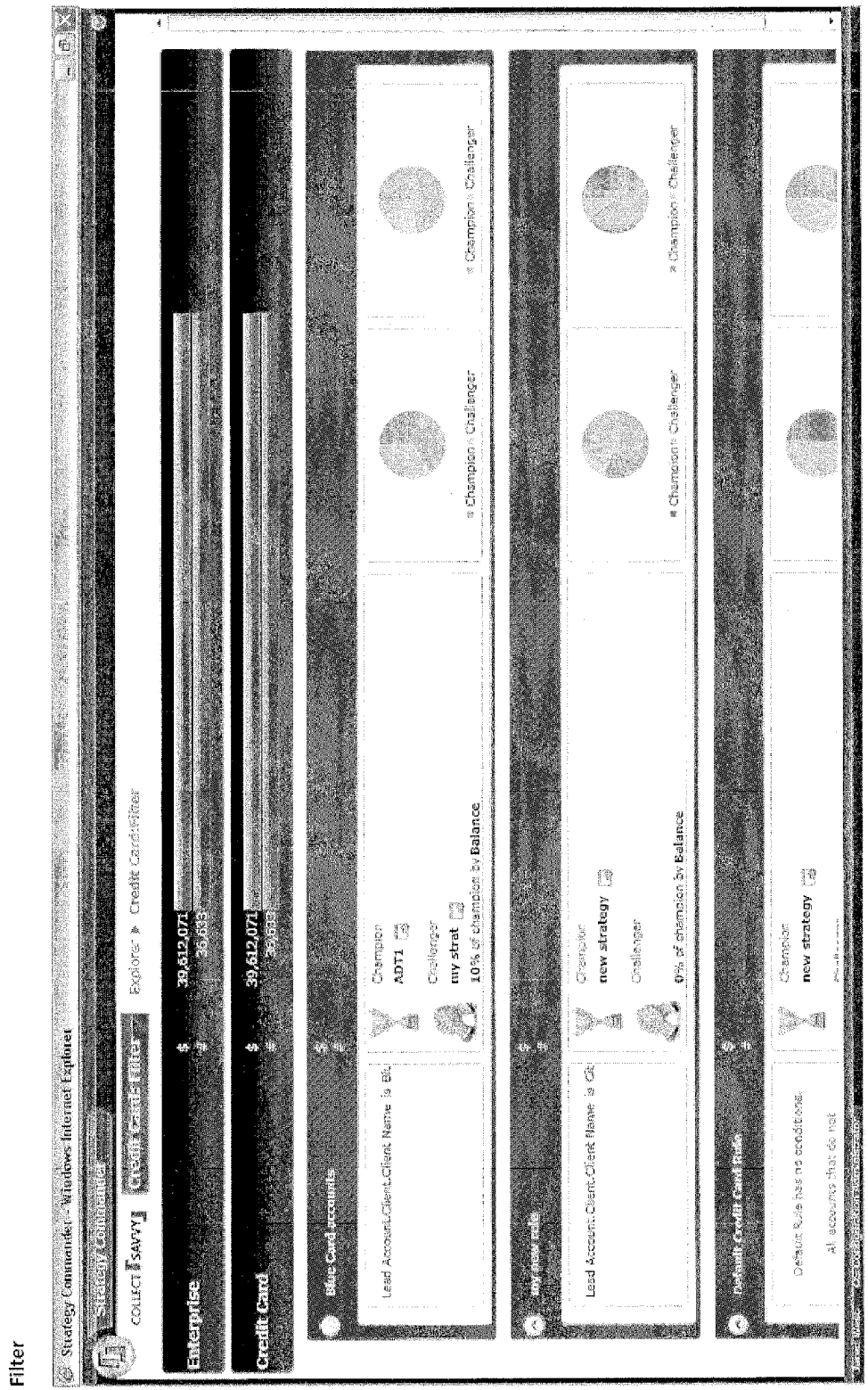
Figure 5B:
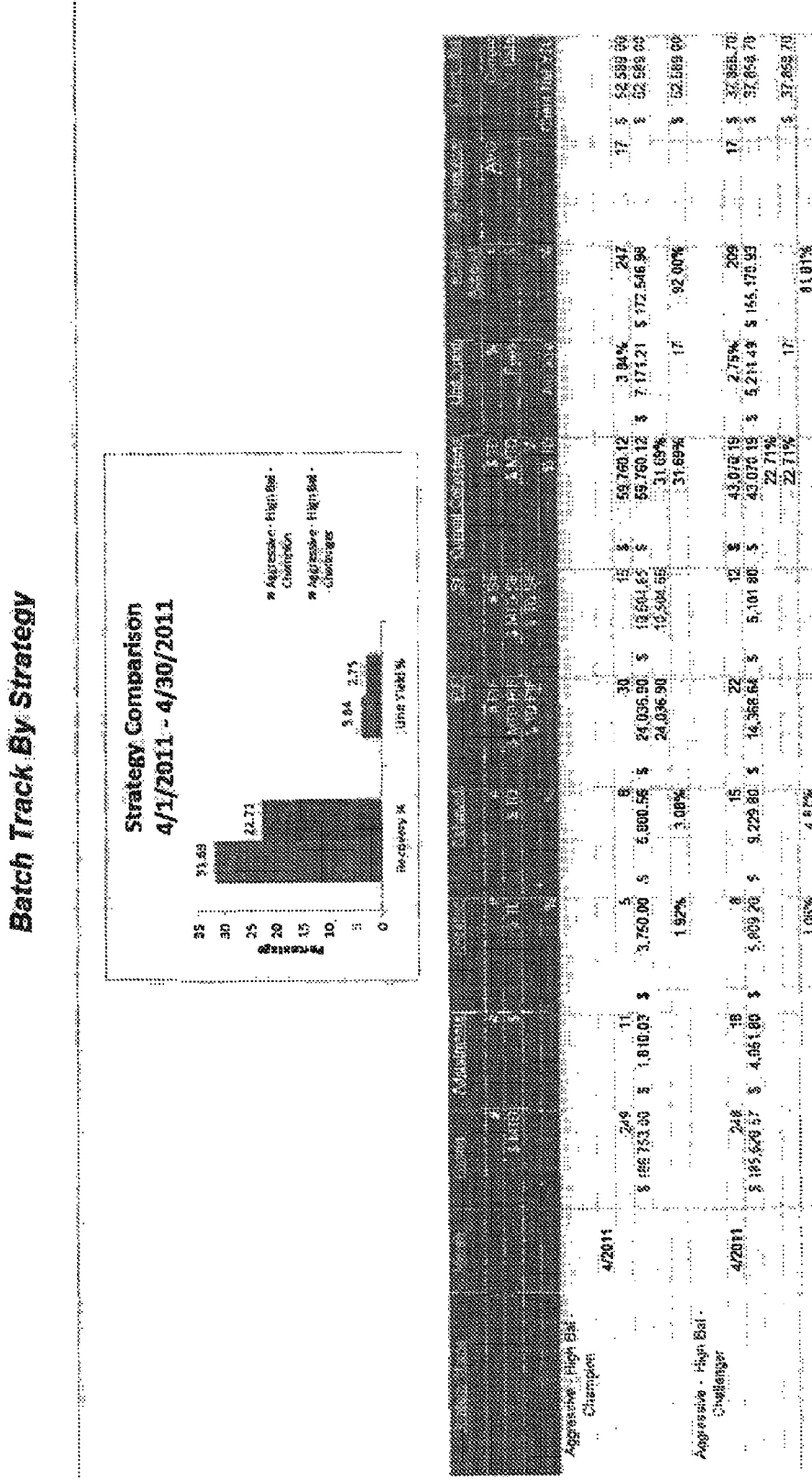

FIG. 5a shows a graphical user interface displaying the number and aggregated balance of accounts being managed by the champion and challenger strategies. As noted above, champion and challenger represent different strategies that can be compared to determine what strategy is best for collecting money from a particular group of accounts or type of debt. FIG. 5b shows a comparison of the results of the champion and challenger strategies. The results for the champion and challenger strategies shown in FIG. 5b may provide a user with valuable insight into what strategy is working. The Strategy Commander tool may also use this information to automatically improve the collection process by, for example, favoring the strategy with the better results and applying that strategy to more accounts.

Figure 6A:
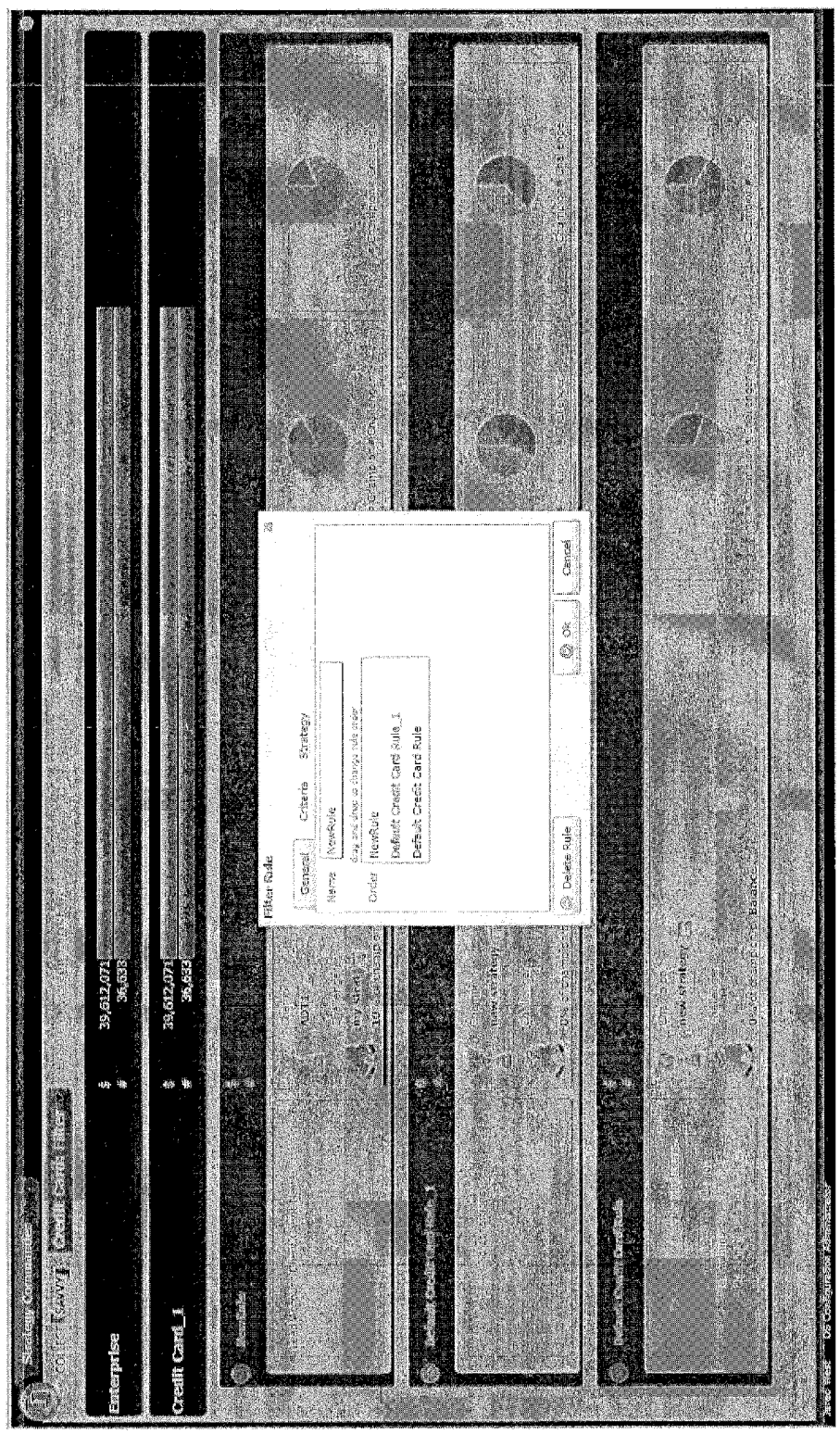
Figure 6B:
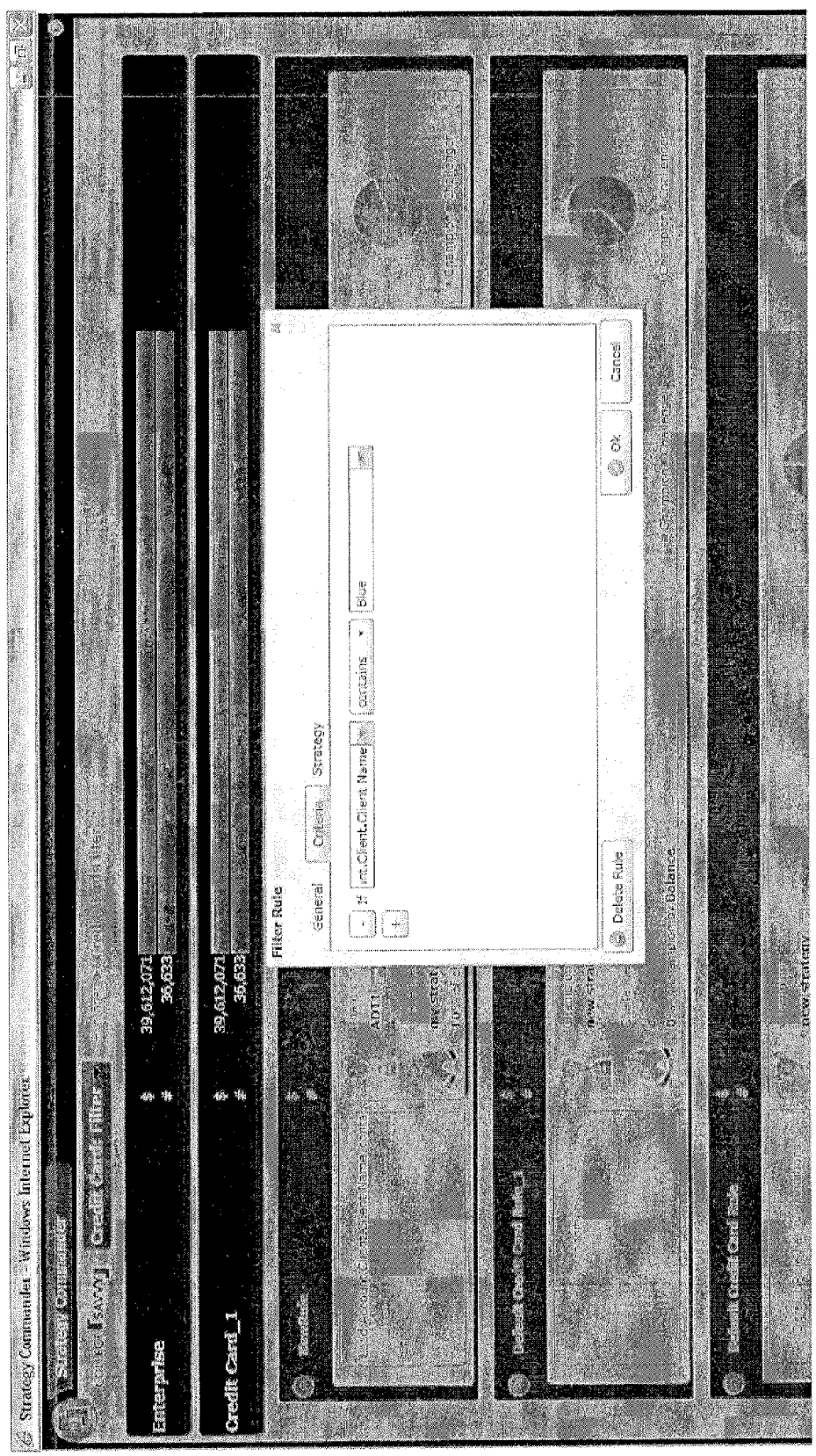
Figure 6C:

FIG. 6a shows a graphical user interface of the Filter step 150 where the rules that govern the Filter step 150 are selected and ordered. The rules may be put in a particular order by dragging and dropping each order in the desired place. FIG. 6b shows a graphical user interface of the Filter step 150 where the rules selected and ordered in FIG. 6a may be set up with various criteria for identification and operation. FIG. 6c shows a graphical user interface of the Filter step 150 where the strategy for each of the champion and challenger may be selected. As noted previously, the tool may select the appropriate strategies automatically based upon various factors, such as collectability score and the like. In addition, FIG. 6c shows that the user may choose the percent of accounts to be segmented from the Champion strategy and placed under the Challenger strategy. The selection of the percent of accounts may also be done automatically by the tool.

Figure 7:
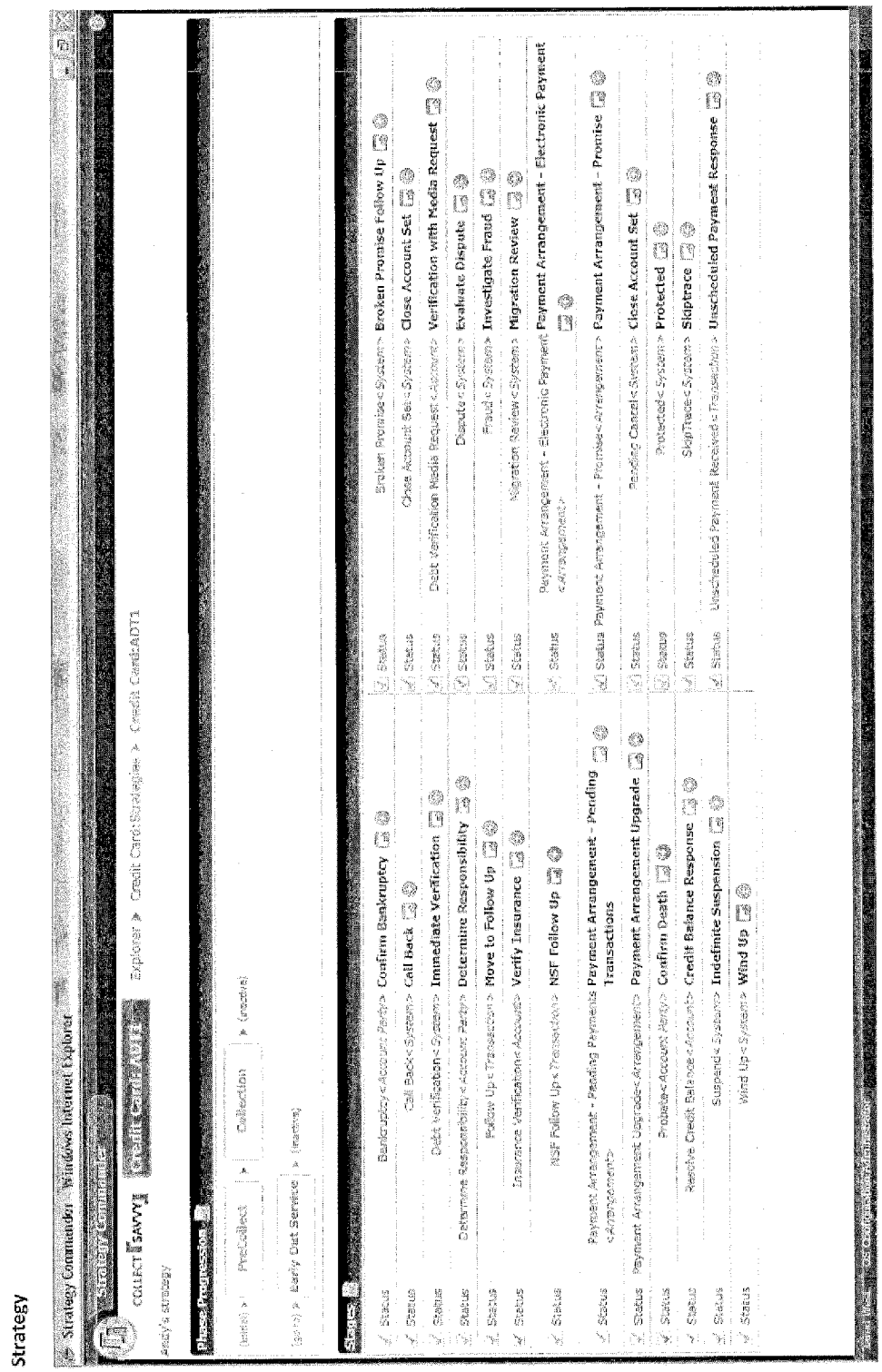

FIG. 7 shows a graphical user interface for a line of business (Credit Card) including the phase progression and the stages for "ADT1: Andy's strategy." As shown in FIG. 7, the phase progression may include visualizations of the conditions for the collection flow. The possible alternate paths or stages are also displayed with the ability to view the details of the program or activity for a given stage.

Figure 8A:
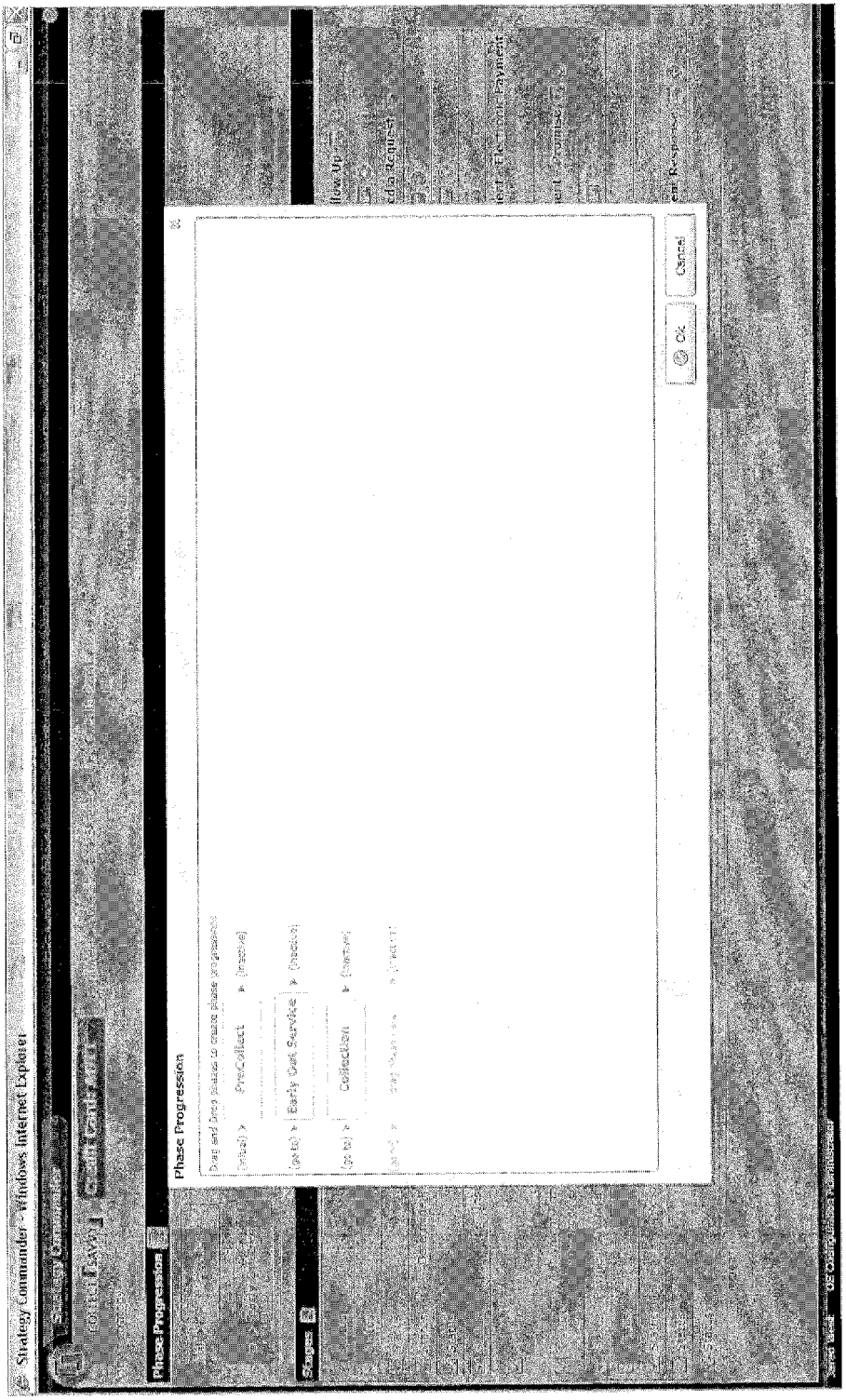
Figure 8B:
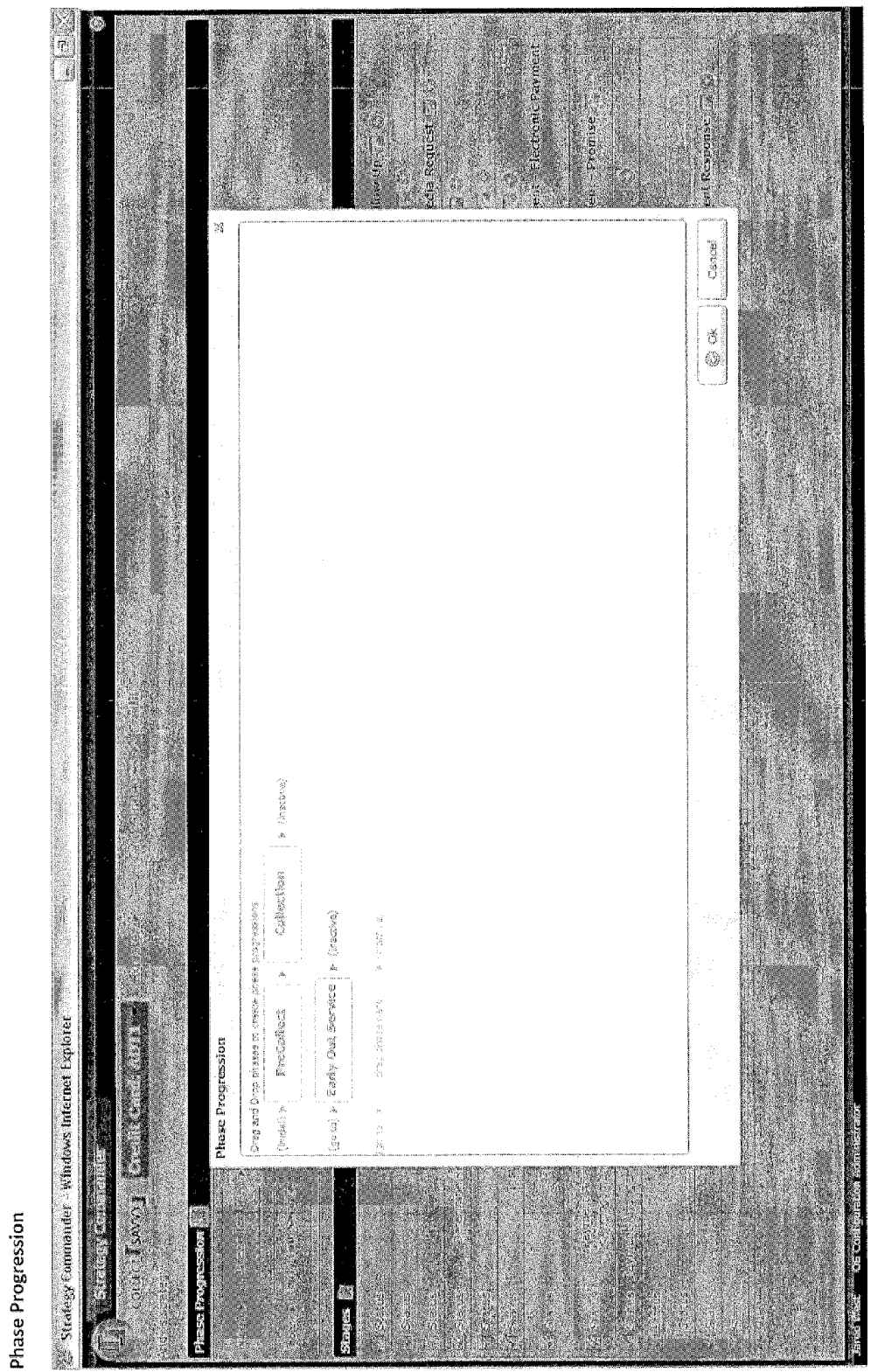

FIGS. 8a and 8b show a graphical user interface where the phase progression portion of FIG. 7 has been selected. The phase progression visualization may be altered by dragging and dropping phases. As shown in FIG. 8a, the Collection phase is positioned beneath the Early Out Service and Pre-Collect phases. After dragging and dropping the Collection phase next to the PreCollect phase, the Collection phase is positioned next to the PreCollect phase (see FIG. 8b). The alteration of the visualization (e.g., dragging and dropping phases) directly affects the operation of the collection process. In other words, changes to the visualization of the phase progression may result in changes to the collection process performed by the system not just the visualization.

Figure 9A:
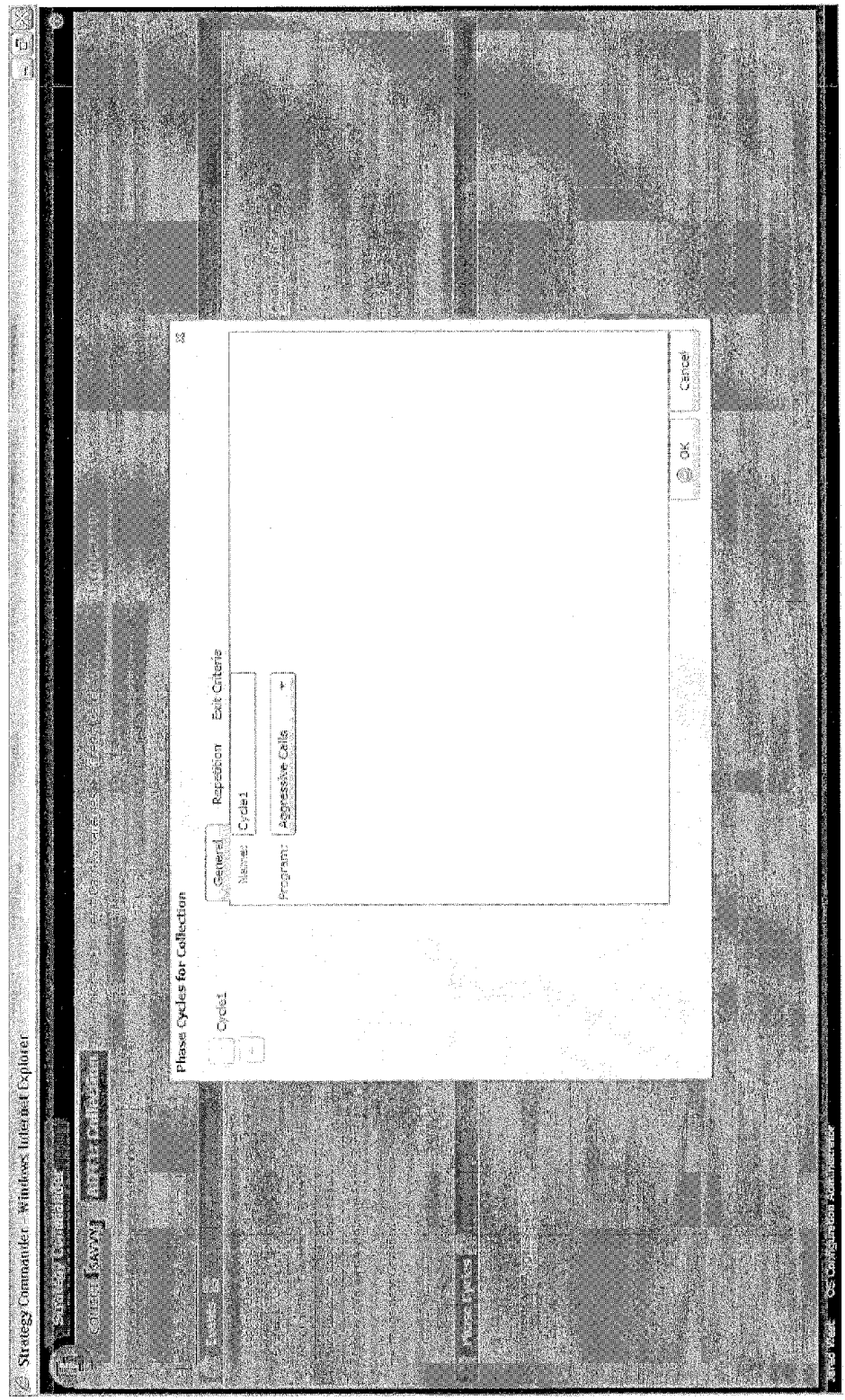
Figure 9B:
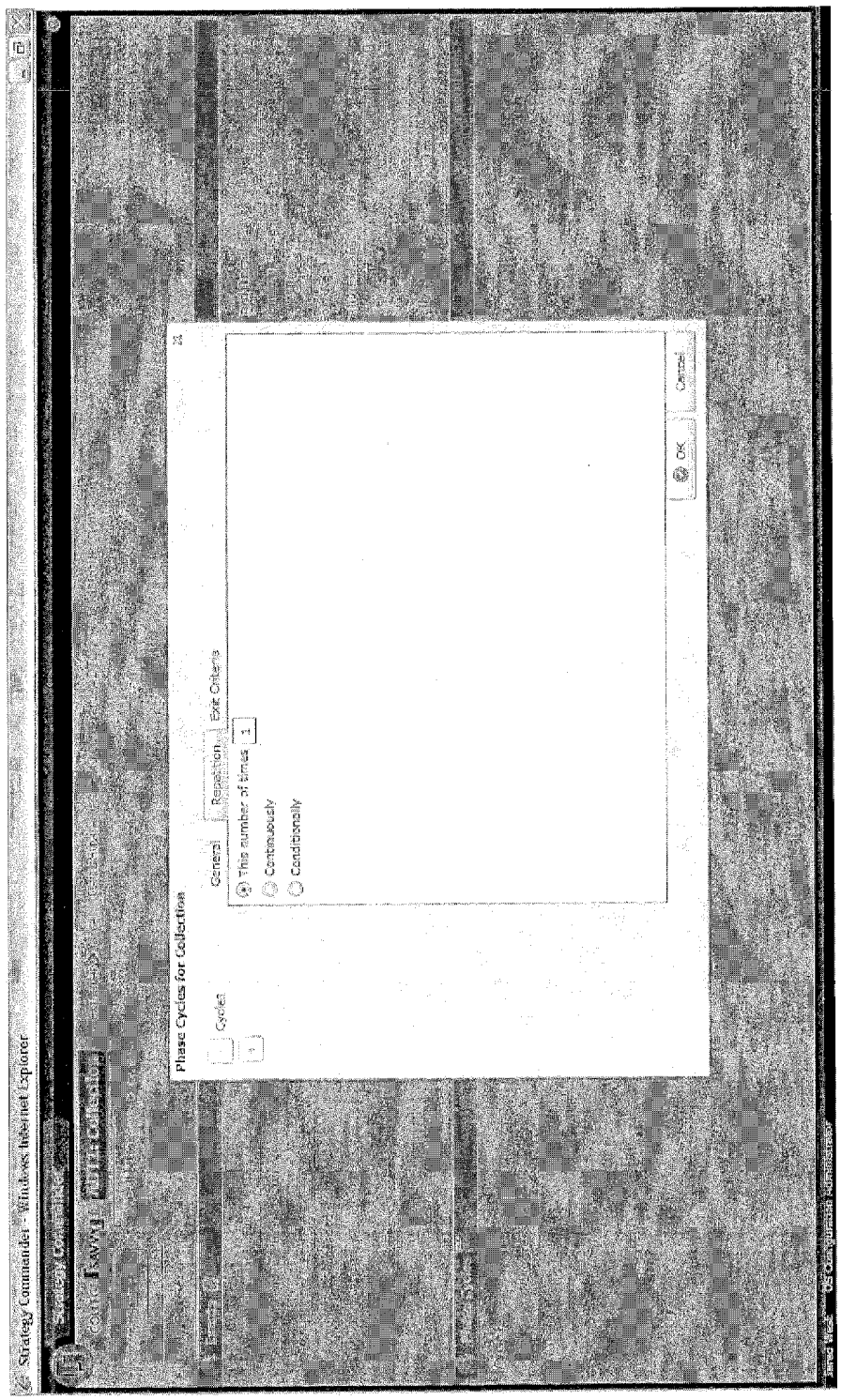
Figure 9C:
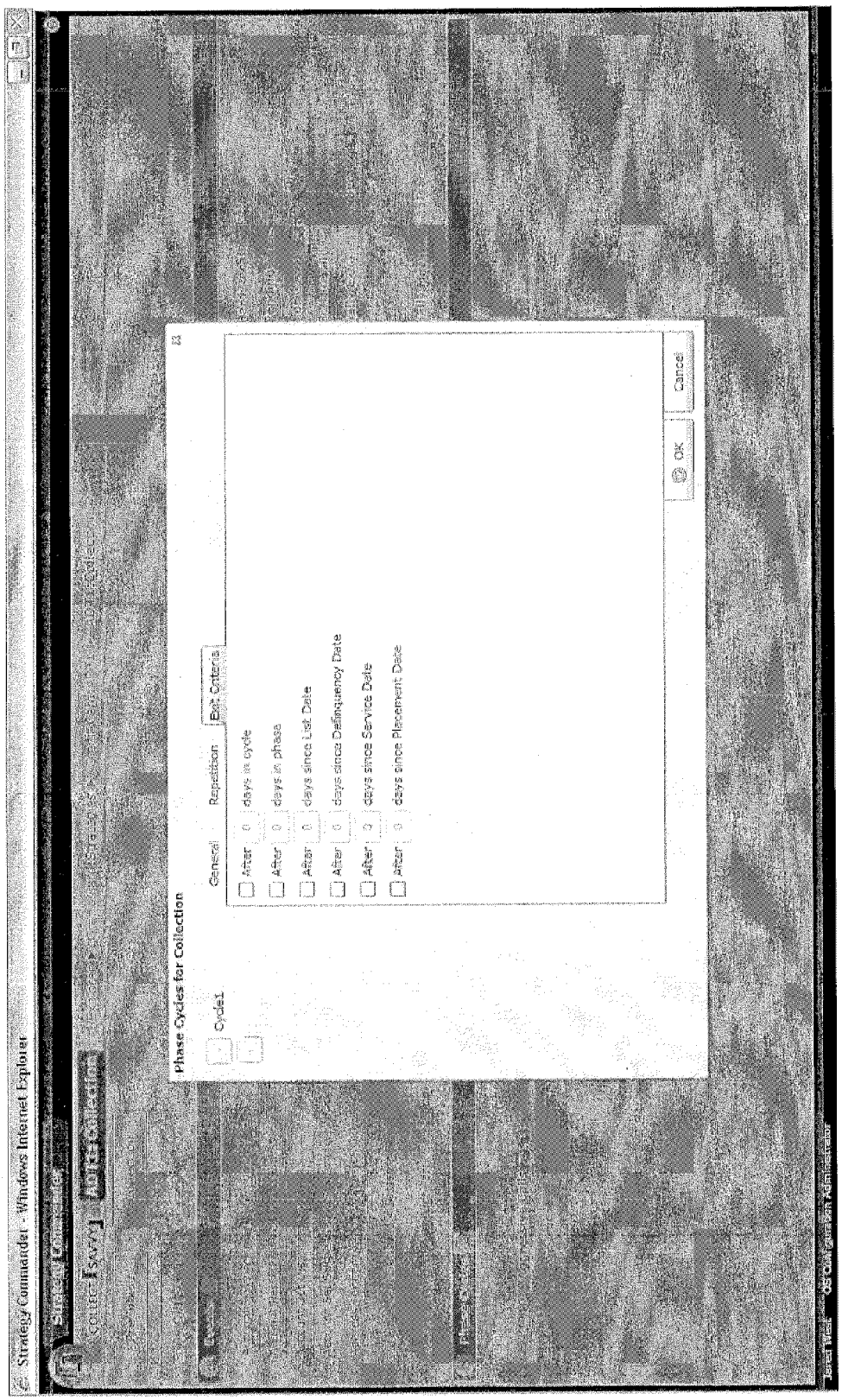
Figure 10:
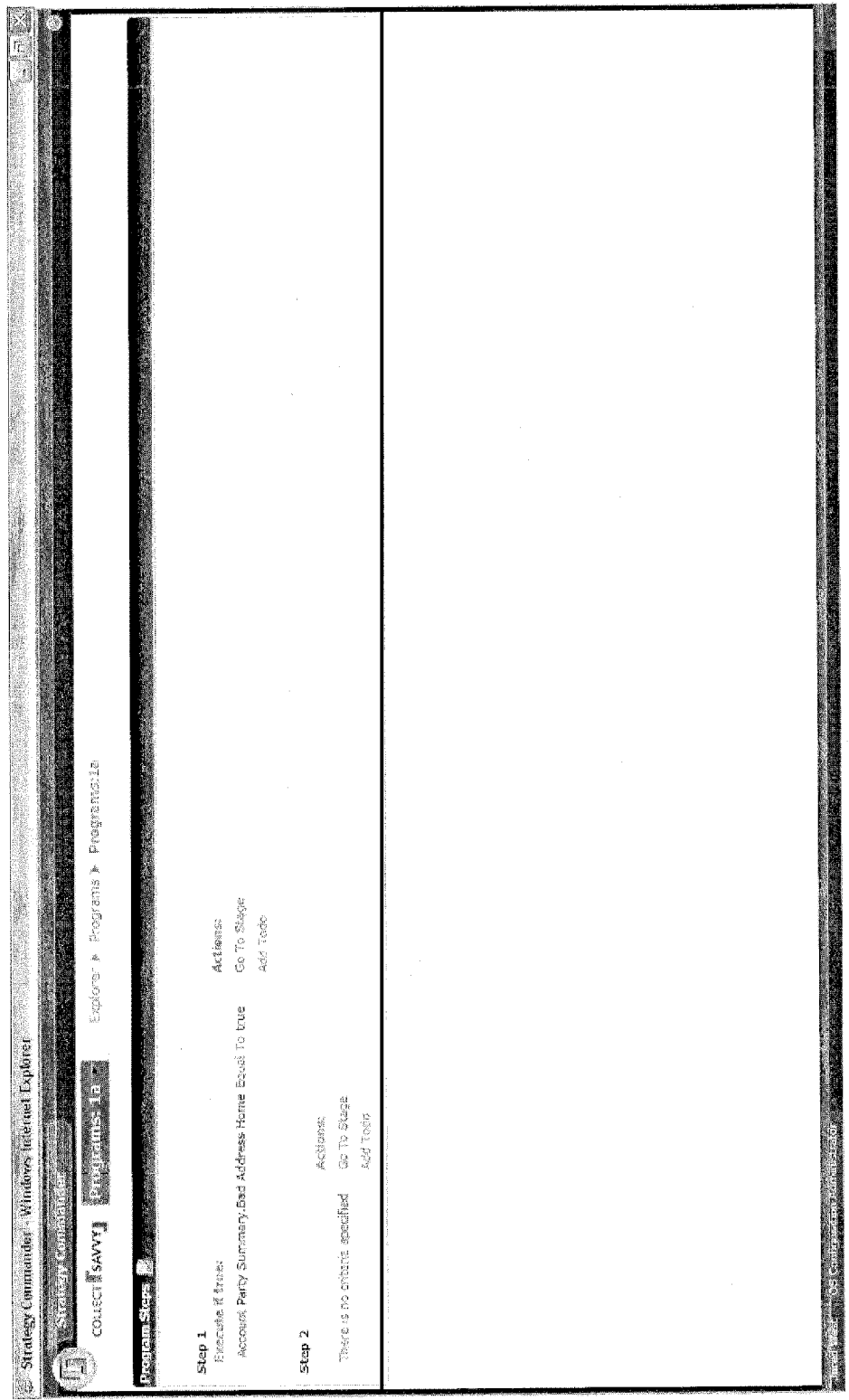

FIG. 9a shows a graphical user interface where the programs for cycles of phases may be chosen. For example, as shown in FIG. 9a, Cycle 1 is selected to have a program of aggressive calls, which may include multiple calls per day, per week, or per month. FIG. 9b shows a graphical user interface where the repetition of activity (e.g., phone calls) may be selected. FIG. 9c shows a graphical user interface where the exit criteria for the cycle may be chosen. As noted previously, the tool may select the appropriate programs and related features automatically. FIG. 10 shows a visualization of the conditions for executing the steps of a program.

The following discussion relating to FIGS. 11-14 describes an example of a computer-readable medium that comprises the steps of the method 100c described above. The computer program described in FIGS. 11-14 is referred to herein as the Best Data tool. It should be noted that the Best Data tool may be on its own or along with or to complement one or more programs. The Best Data tool may also be part of a program, such as a part of the Strategy Commander tool. FIGS. 11-14 show a graphical user interface of the debt collection software showing the results of the Best Data tool for various steps of the method 100c described above. The Best Data tool provides a centralized configuration and visualization area for account party data management processes. It may include a completely automated and controlled execution of the data optimization with both proactive and reactive processing. It should be noted that various aspects of the Best Data tool may be manually driven. For instance, the Best Data tool may present the user with its suggestion for best data but allow the user to ultimately choose.

The Best Data tool may be based on any development platform, such as Microsoft® Silverlight® application. While the Microsoft® Silverlight® application may be used, any other number of development platforms may also be used. As noted above, the Best Data tool incorporates business and collection intelligence to provide a user with a rich, context-aware interface for managing account party data, including continuously or periodically updating the account party data. It uses visualization techniques to make account party data updates easy to identify. The Best Data tool generally allows debt collectors to manage account party data automatically without the need to analyze each and every incoming source of information.

Figure 11:
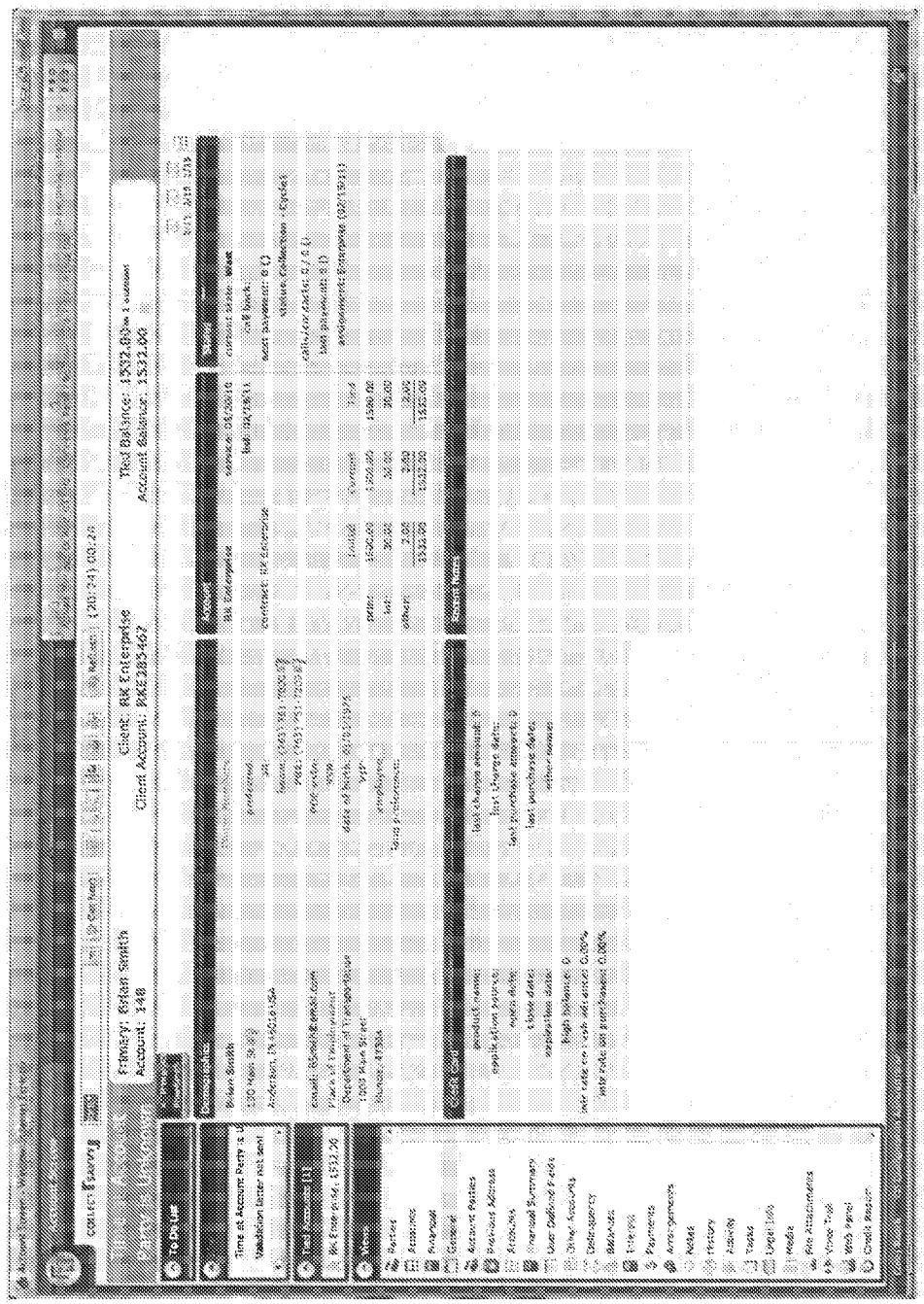
FIGS. 11-14 illustrate a graphic user interface of the Best Data tool according to at least one embodiment of the present disclosure.

FIG. 11 shows a graphical user interface of the Best Data tool showing demographic information for an account party (Brian Smith). The Best Data tool may permit manual entry of demographic information or other information and/or may be configured to receive such information from various electronic sources.

Figure 12:
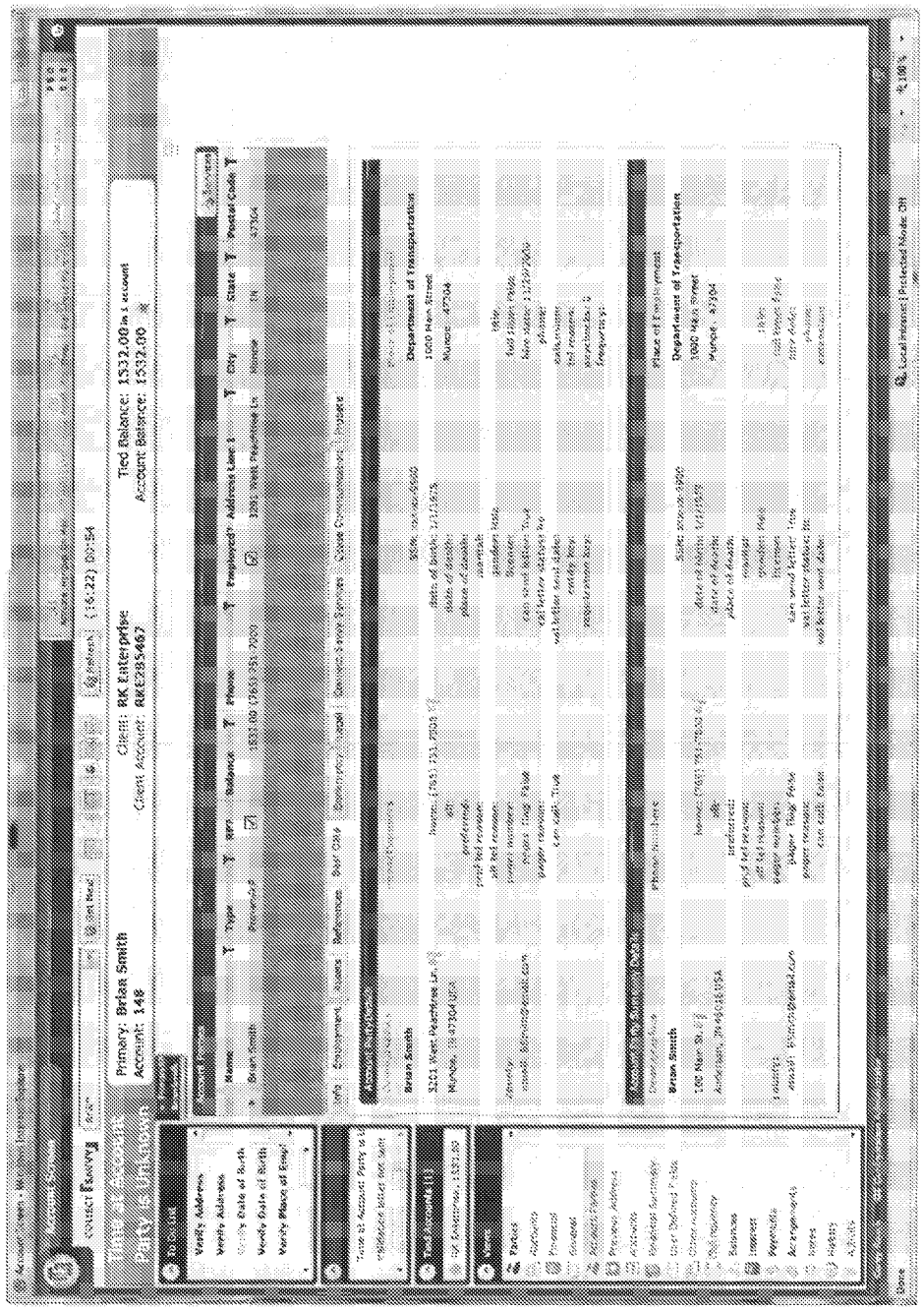
Figure 13:
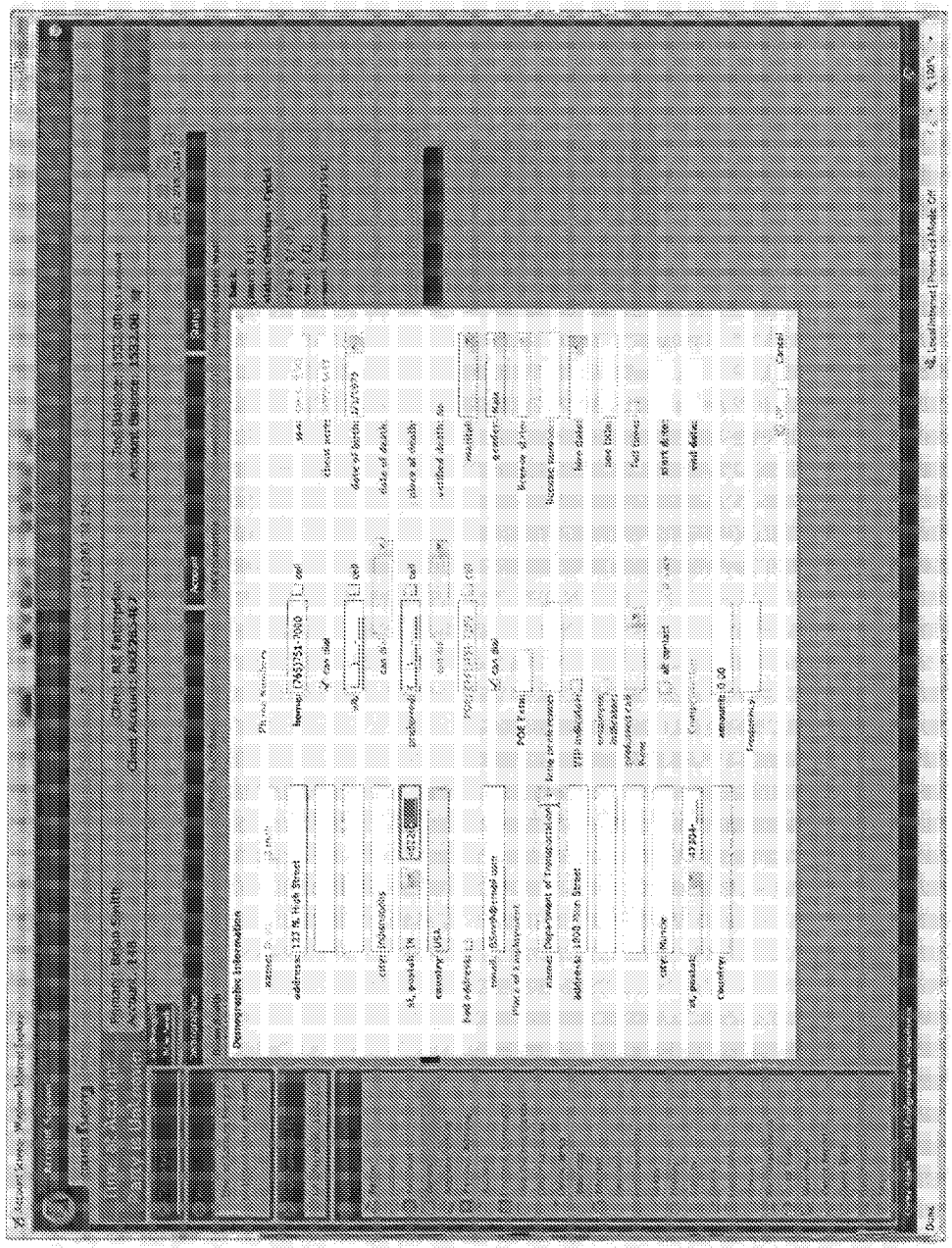
Figure 14:
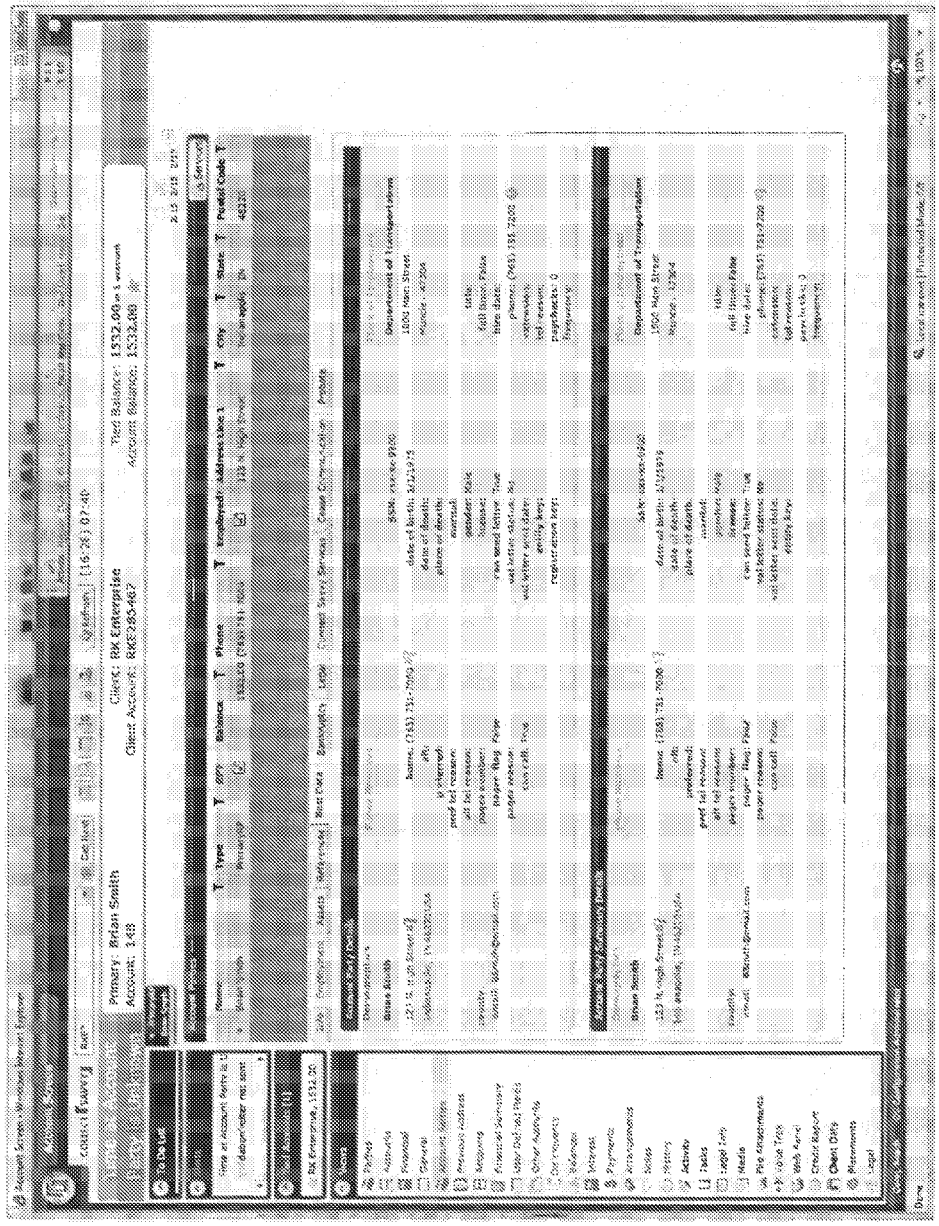

FIG. 12 shows a graphical user interface of the Best Data tool showing Account Party Summary Details and Account Party Details. In this case, the Account Party Summary Details provides the current account party data (best data). The Account Party Details provides a subset of the information of the Account Party Summary Details that can be shared with a particular client. FIG. 13 shows a graphical user interface of the Best Data tool showing an example of a manual update of the account party's address. FIG. 14 shows that the change in address in FIG. 13 was determined to be the best data by the Best Data tool. As a result, the address for Brian Smith has been updated to the 123 N. High Street.

It should be noted that the method, system, and computer-readable medium for optimizing data of the present disclosure may be used along with or to complement one or more programs. For example, a program that is designed to maximize collection efforts through testing collection strategies and choose the best collection strategy may utilize the Best Data tool to manage the personal account information for debtors.

The following discussion relating to FIGS. 15-19 describes an example of a computer-readable storage medium that comprises the steps of the method 100d described above. The computer program described in FIGS. 15-19 is referred to herein as the Margin Watch tool. FIGS. 15-19 show graphical user interfaces of the Margin Watch tool for various steps of the method 100d described above. The Margin Watch tool provides a centralized configuration and visualization area for receivables management processes.

The Margin Watch tool may be based on any development platform, such as Microsoft® Dynamics® CRM. While the Microsoft® Dynamics® CRM is used, any other number of development platforms may be used. The Margin Watch tool incorporates business or collection intelligence to provide a user with a rich, context-aware interface for monitoring profit margins on accounts. The Margin Watch tool may include the ability for a user to review trends and specific activities for a particular account. It also may offer option-based detail definition to both provide overall clarity and full transparency to the details. For example, the user may optionally specify particular event actions such that the user is prompted for input in certain circumstances, such as, for example, when Margin Watch Expenses approach the Margin Watch Threshold.

The Margin Watch tool generally allows business executives and others that manage receivables to monitor profit margins for accounts without the need for an IT administrator by providing a user-friendly application and automating many of the steps of operation. It improves efficiency of operations through a proactive approach to collection process automation.

Figure 15:
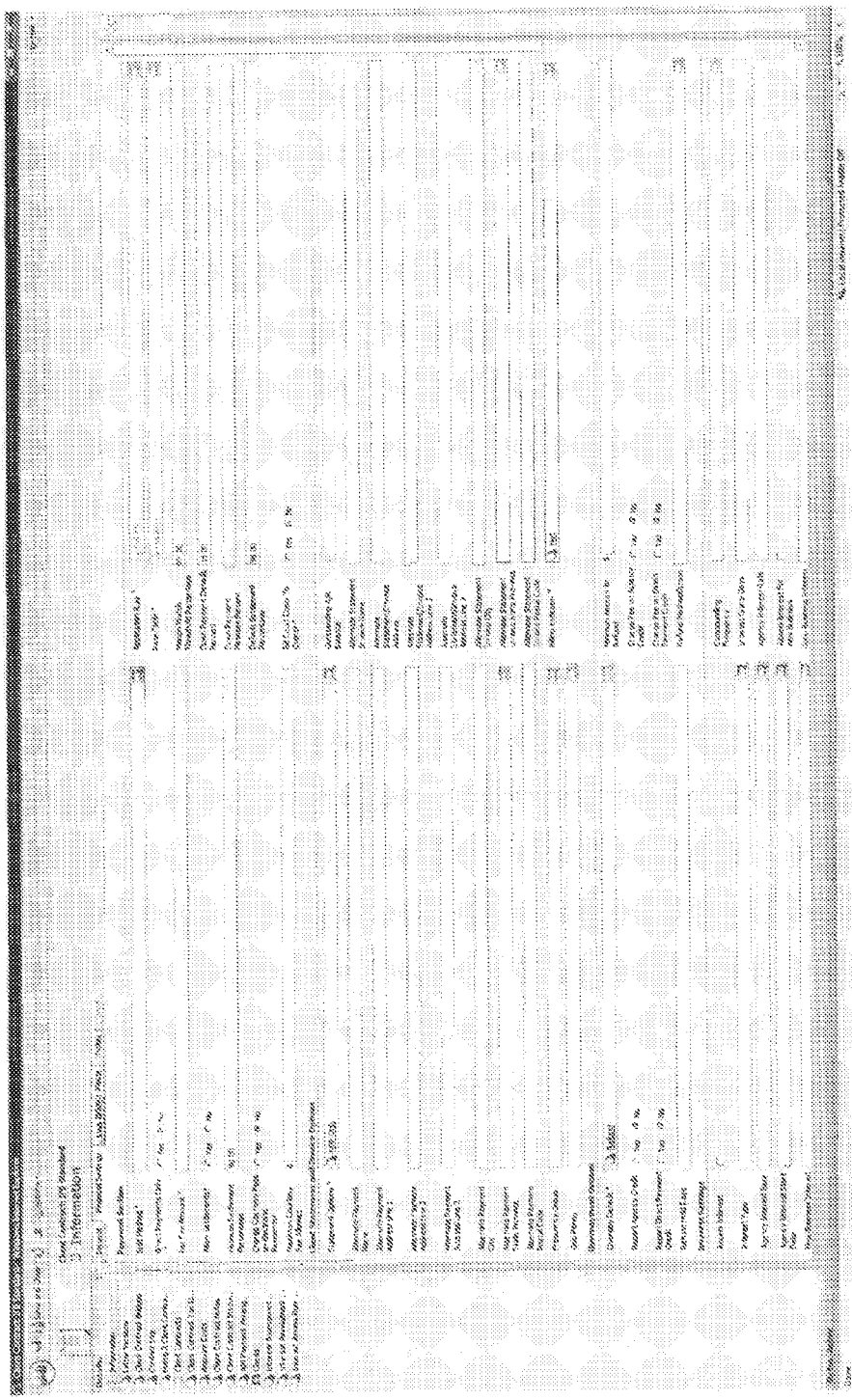

As shown in FIG. 15, the Margin Watch tool may include a client contract form configured to receive a Margin Watch Threshold percentage. The contract form in FIG. 15 displays minimum and default settlement percentages, down payment default percent, and a Margin Watch Threshold percentage. In FIG. 15, the Margin Watch Threshold percentage is selected to be fifty (50) percent.

Figure 16:
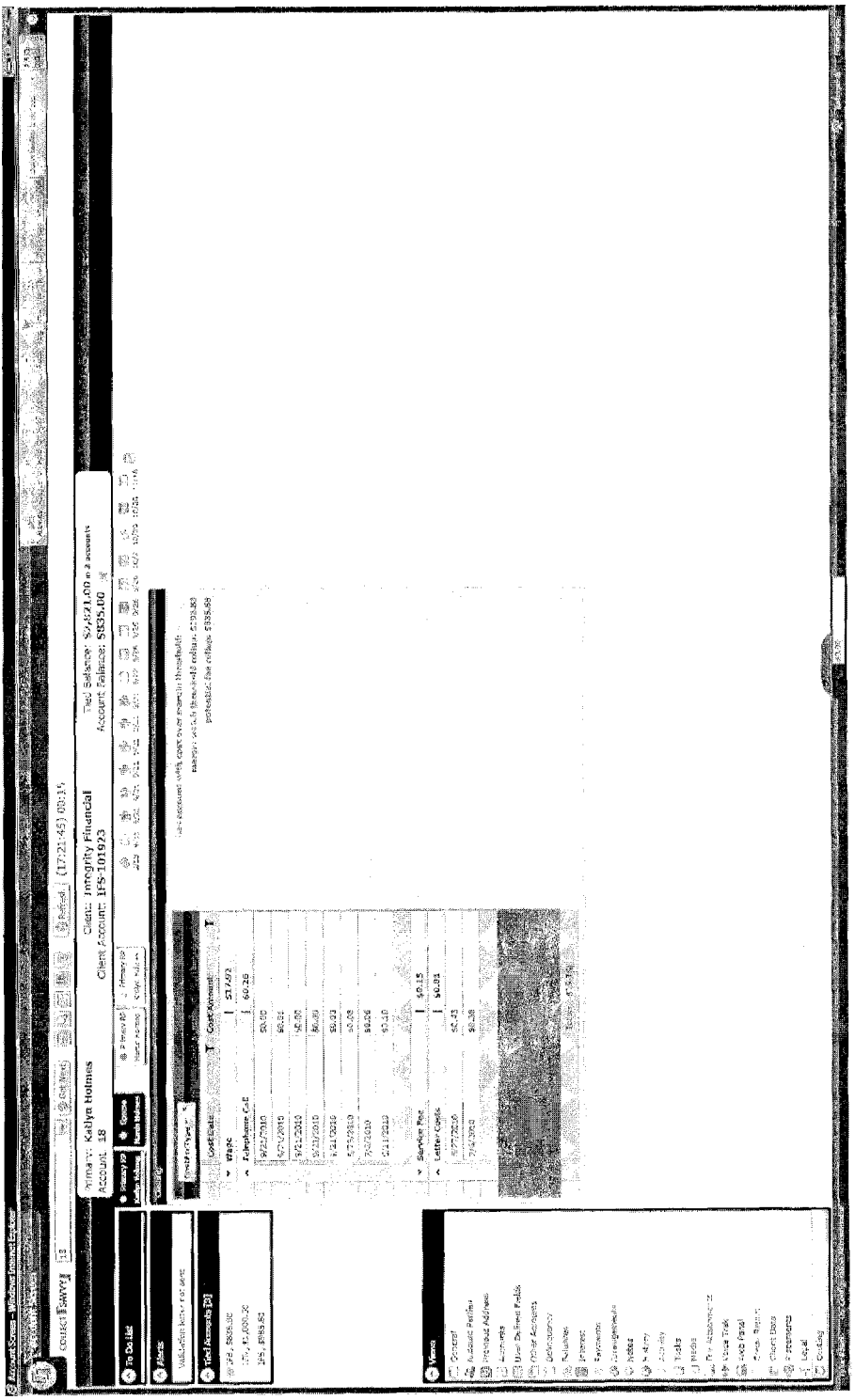

FIG. 16 shows a graphical user interface displaying a costing window and timer. As shown in FIG. 16, a history of costs, including wage, telephone, service fees, and letter costs, may be displayed. Also shown in FIG. 16, a costing window may include an indication of the number of tied accounts and the debt in each of those accounts, the margin watch threshold rollup, and potential fee rollup. The potential fee rollup value indicates the contingency fee amount that may be received for collecting the account or accounts from the client(s) who listed the account or accounts. The margin watch threshold rollup value indicates the sum Margin Watch Threshold figures for the account or accounts that are tied. FIG. 16 also shows two types of timers, which are located at the top of the screen next to the Refresh button. In FIG. 16, one timer indicates the total time (namely, 17:21:45) that has been spent working on the accounts. The other timer shown in FIG. 16 indicates the total time (namely 00:15) that has been spent working on the account during this session. Of course, various other timers may be displayed to show time breakdowns. It should be noted that the timers may be used for calculating costs during the Margin Watch Expenses step 120c.

Figure 17:
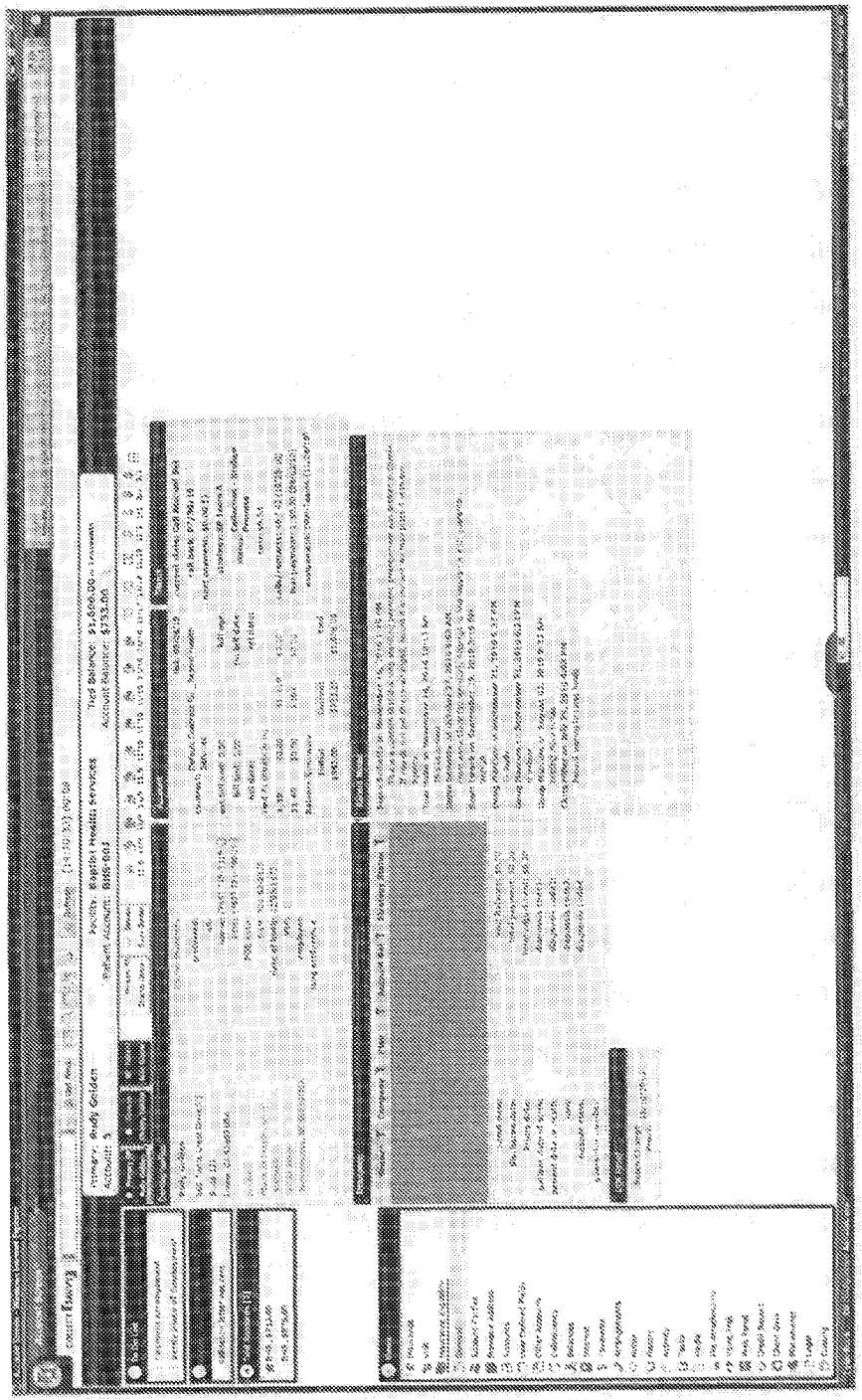

FIG. 17 shows a graphical user interface displaying an account screen. As shown in FIG. 17, the account screen may include demographic information for the account holder, insurance information, account information, status of the account, and notes regarding activity on the account. Under the Status window of FIG. 17, the cost of expenses for recovery is shown as $9.53. It should be noted that the value of the cost may be highlighted various colors or blink in certain situations. For example, the value of the cost and the term "Cost" may be highlighted red when the Margin Watch Expenses have exceeded the Margin Watch Threshold, highlighted yellow when the Margin Watch Expenses enter within a predetermined range of the Margin Watch Threshold, highlighted green as long as the Margin Watch Expenses are outside of the predetermined range and do not exceed the Margin Watch Threshold. Of course, various other information in the Margin Watch tool may be colored, blinking, flashing, or the like to alert the user to a particular situation, including the occurrence of an Event.

Figure 18:
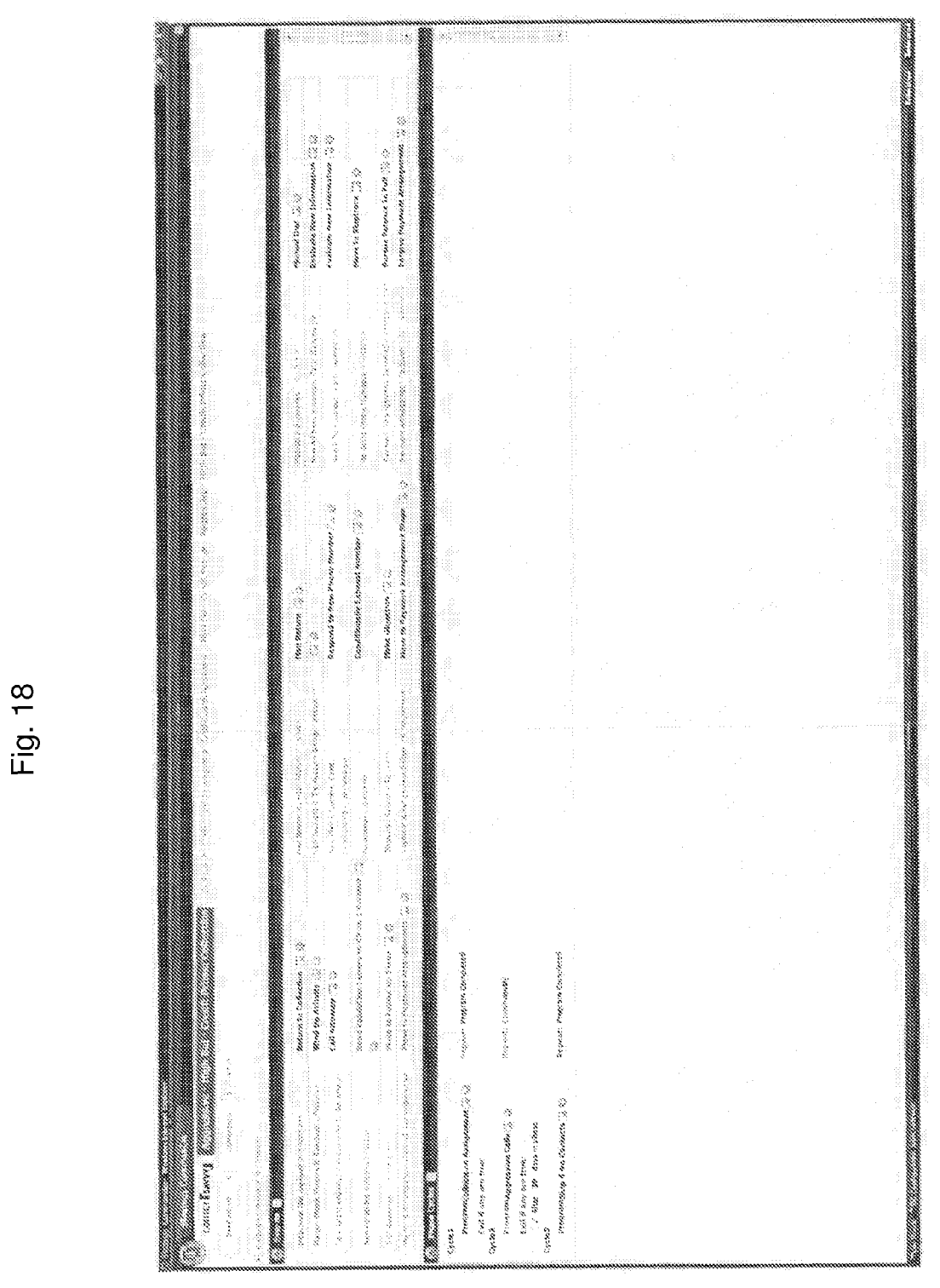
Figure 19:
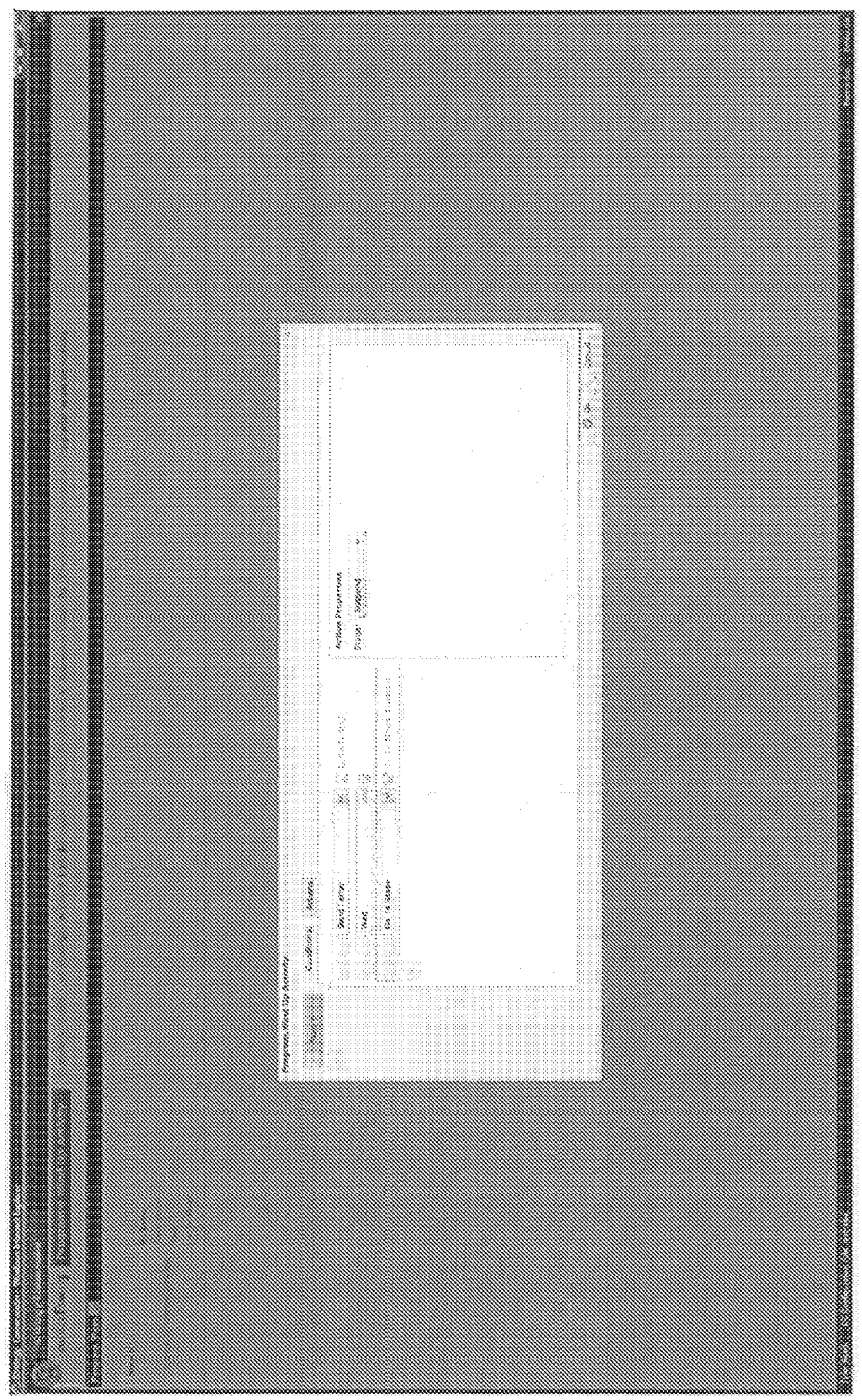

FIG. 18 shows a graphical user interface that provides a user with the ability to customize the actions that will occur because of the occasion of various events, including what phase cycles are implemented for an account. For example, one event in FIG. 18 is "Margin Watch Threshold Reached" along with the corresponding "Wind Up Activity." A user may select the Wind Up Activity icon to customize what actions will be taken when the Margin Watch Threshold is reached. For instance, FIG. 19 shows an example of a graphical user interface allowing for customization of the Wind Up Activity that may be run after Margin Watch Expenses exceed the Margin Watch Threshold. As shown in FIG. 19, the actions selected may include sending a letter, waiting for a period of time, and entering a particular stage. In FIG. 19, the action selected is Suspended, which may include terminating collection activities.

While this disclosure has been described as having various embodiments, these embodiments according to the present disclosure can be further modified within the scope and spirit of this disclosure. This application is therefore intended to cover any variations, uses, or adaptations of the disclosure using its general principles. For example, any methods disclosed herein and in the appended documents represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

That which is claimed is:

1. A method for managing and collecting receivables, the method comprising:
    providing at least one pre-existing account with first account information, the first account information having first account party data;
    providing at least one new account, each new account comprising new account information, the new account information having new account party data;
    determining, by a processor, whether the first account party data of the at least one pre-existing account matches the new account party data of the at least one new account and if so, tying the at least one new account with the at least one matching pre-existing account to create a tied account;
    calculating, by the processor, a collectability score for any unmatched new account and any tied account based on at least one financial parameter;
    determining, by the processor, one or more collection strategies for any unmatched new account and any tied account based on the calculated collectability score; and
    applying, by the processor, the one or more collection strategies to any unmatched new account and any tied account.

2. The method of claim 1, further comprising the step of verifying that the new account information of an unmatched new account or the first account information of any tied account is current.

3. The method of claim 1, further comprising the step of optimizing data, wherein the step of optimizing data comprises:
    receiving third account information regarding any unmatched new account or any tied account;
    determining best data between the third account information and the new account information of any unmatched new account or the first account information of any tied account information; and
    updating the new account information of any unmatched new account or the first account information of any tied account with the best data.

4. The method of claim 3, wherein the step of optimizing data further comprises after updating the new account information or first account information with the best data, sharing the new account information or first account information.

5. The method of claim 4, wherein the step of applying one or more collection strategies comprises:
    defining a threshold value for one or more accounts by choosing a threshold percentage of potential fees;
    automatically determining expenses incurred for collection recovery efforts for the one or more accounts; and
    automatically comparing the expenses against the threshold value and when the expenses exceed the threshold value, performing actions that mitigate further costs associated with collection recovery efforts.

6. The method of claim 5, wherein performing actions that mitigate further costs comprises adjusting one or more collection recover efforts.

7. The method of claim 5, wherein performing actions that mitigate further costs comprises terminating one or more collection recovery efforts.

8. A system for managing and collecting receivables, the system comprising:
    a data storage unit having stored therein at least one pre-existing account with first account information, the first account information having first account party data, and at least one new account, each new account comprising new account information, the new account information having new account party data;

a computer, coupled to the data storage unit, that is configured to:

determine whether the first account party data of the at least one pre-existing account matches the new account party data of the at least one new account and if so, tie the at least one new account with the at least one matching pre-existing account to create a tied account;

calculate a score for any unmatched new account and any tied account based on at least one financial parameter;

determine one or more collection strategies for any unmatched new account and any tied account based on the calculated score; and apply one or more collection strategies to any unmatched new account and any tied account.

9. The system of claim 8, wherein the computer is further configured to verify that the new account information of any unmatched new account or the first account information of any tied account is current.

10. The system of claim 8, wherein the computer is further configured to optimize data, through the steps of:

receiving third account information regarding any unmatched new account or any tied account;

determining best data between the third account information and the new account information of any unmatched new account or the first account information of any tied account information; and updating the new account information of any unmatched new account or the first account information of any tied account with the best data.

11. The method of claim 10, wherein after updating the new account information or first account information with the best data, the computer is further configured to share the new account information or first account information.

12. The method of claim 10, wherein the application of one or more collection strategies comprises:

defining a threshold value for one or more accounts by choosing a threshold percentage of potential fees;

automatically determining expenses incurred for collection recovery efforts for the one or more accounts; and automatically comparing the expenses against the threshold value and if the expenses exceed the threshold value, performing actions that mitigate further costs associated with collection recovery efforts.

13. The method of claim 12, wherein performing actions that mitigate further costs comprises adjusting one or more collection, recovery efforts.

14. The method of claim 12, wherein performing actions that mitigate further costs comprises terminating one or more collection recovery efforts.

15. A non-transitory computer-readable medium for managing and collecting receivables, the non-transitory computer-readable medium having code embodied thereon, said code when executed by a computer causes the computer to perform steps including:

providing at least one pre-existing account with first account information, the first account information having first account party data;

providing at least one new account, each new account comprising new account information, the new account information having new account party data;

determining whether the first account party data of the at least one pre-existing account matches the new account party data of the at least one new account and if so, tying the at least one new account with the at least one matching pre-existing account to create a tied account;

calculating a collectability score for any unmatched new account and any tied account based on at least one financial parameter;

determining one or more collection strategies for any unmatched new account and any tied account based on the calculated collectability score; and applying the one or more collection strategies to any unmatched new account and any tied account.

16. The non-transitory computer-readable medium of claim 15, wherein the code is further configured for verifying that the new account information of any unmatched new account or the first account information of any tied account is current.

17. The non-transitory computer-readable medium of claim 15, wherein the code is further configured for:

receiving third account information regarding any unmatched new account or any tied account;

determining best data between the third account information and the new account information of any unmatched new account or the first account information of any tied account information;

updating the new account information of any unmatched new account or the first account information of any tied account with the best data.

18. The non-transitory computer-readable medium of claim 17, wherein after updating the new account information or first account information with the best data, the code is further configured to share the new account information or first account information.

19. The non-transitory computer-readable medium of claim 18, wherein performing actions that mitigate further costs comprises one or more collection recovery efforts.

20. The non-transitory computer-readable medium of claim 17, wherein the application of one or more collection strategies in the code comprises:

a threshold value for one or more accounts;

automatically determining expenses incurred for collection recovery efforts for the one or more accounts; and automatically comparing the expenses against the threshold value and if the expenses exceed the threshold value, performing actions that mitigate further costs associated with collection recovery efforts.

* * * * *